(12) United States Patent
Shirota et al.

(10) Patent No.: US 7,542,480 B2
(45) Date of Patent: Jun. 2, 2009

(54) COMMUNICATION DEVICE

(75) Inventors: Katsuya Shirota, Kawasaki (JP); Akira Shimamura, Yokohama (JP); Masakazu Nakamura, Yokohama (JP); Koichi Mita, Yokohama (JP); Takashi Arai, Yokohama (JP); Hideaki Watanabe, Yokohama (JP); Kazuki Mishima, Yokohama (JP); Ryuichi Hiroi, Ojiya (JP)

(73) Assignee: Fujitsu Microelectronics Limited, Tokyo (JP)

( * ) Notice: Subject to any disclaimer, the term of this patent is extended or adjusted under 35 U.S.C. 154(b) by 797 days.

(21) Appl. No.: 10/931,399

(22) Filed: Sep. 1, 2004

(65) Prior Publication Data

US 2005/0025178 A1      Feb. 3, 2005

Related U.S. Application Data

(63) Continuation of application No. PCT/JP02/02001, filed on Mar. 5, 2002.

(51) Int. Cl.
H04J 3/16         (2006.01)
(52) U.S. Cl. .................... 370/466; 370/395.5
(58) Field of Classification Search ......... 370/465–466, 370/395.5–395.65
See application file for complete search history.

(56) References Cited

U.S. PATENT DOCUMENTS

| | | | |
|---|---|---|---|
| 6,618,366 B1* | 9/2003 | Furukawa et al. | 370/338 |
| 7,143,231 B1* | 11/2006 | Srinivasan et al. | 711/108 |
| 2002/0071433 A1* | 6/2002 | Tsuruoka et al. | 370/389 |
| 2002/0078092 A1* | 6/2002 | Kim | 707/513 |

FOREIGN PATENT DOCUMENTS

| | | |
|---|---|---|
| JP | 01-209841 | 8/1989 |
| JP | 01-209842 | 8/1989 |
| JP | 08-088666 | 4/1996 |
| JP | 08-195783 | 7/1996 |
| JP | 11-317783 | 11/1999 |

* cited by examiner

*Primary Examiner*—Thai D Hoang
(74) *Attorney, Agent, or Firm*—Katten Muchin Rosenman LLP

(57) ABSTRACT

In a communication device which can realize a protocol conversion by a single device without preparing respective packages for existing various protocols, a protocol attribute included in a packet received is detected, protocol processing order data indicating a protocol processing order based on the protocol attribute are generated, and a plurality of protocols within the received packet are processed based on the protocol processing order data.

14 Claims, 18 Drawing Sheets

| SOURCE IP ADDRESS (32 BITS) | PROTOCOL ATTRIBUTE | PROCESSING ORDER HEADER INFORMATION | | PROTOCOL PROCESSING ORDER (PROCESSING PROTOCOL) | | | | | NOTE |
|---|---|---|---|---|---|---|---|---|---|
| | | PRESENT NUMBER OF PROTOCOL PROCESSINGS | TOTAL NUMBER OF PROTOCOL PROCESSINGS | | | | | | |
| 255.255.255.0 | LNS (L2TP) | 0 | 5 | 1 | 6 | 7 | 3 | 1 | |
| 1.2.3.4 | LAC (L2TP) | 0 | 4 | 1 | 6 | 7 | 3 | 0 | |
| 202.243.37.74 | SECURITY GATEWAY (IP sec AH AUTHENTICATION) | 0 | 2 | 4 | 1 | 0 | 0 | 0 | |
| 61.22.33.44 | SECURITY GATEWAY (IP sec ESP CIPHER) | 0 | 3 | 5 | 1 | 1 | 0 | 0 | TUNNEL MODE |
| 61.22.33.45 | SECURITY GATEWAY (IP secESP CIPHER) | 0 | 2 | 5 | 1 | 0 | 0 | 0 | TRANSPORT MODE |
| 125.30.33.2 | ROUTER (IPv6→IPv4 NETWORK TUNNEL) | 0 | 1 | 1 | 0 | 0 | 0 | 0 | TUNNELING IPv6 PACKET TO IPv4 NETWORK |
| 5.5.5.5 | ROUTER (IPv4→IPv6 NETWORK TUNNEL) | 0 | 1 | 2 | 0 | 0 | 0 | 0 | TUNNELING IPv4 PACKET TO IPv6 NETWORK |
| 125.30.33.20 | ROUTER (IPv6 NETWORK→IPv4 TUNNEL) | 0 | 2 | 2 | 1 | 0 | 0 | 0 | TAKING OUT TUNNELED IPv4 FROM IPv6 NETWORK |
| 5.5.5.50 | ROUTER (IPv4 NETWORK→IPv6 TUNNEL) | 0 | 2 | 1 | 2 | 0 | 0 | 0 | TAKING OUT TUNNELED IPv6 FROM IPv4 NETWORK |
| 125.30.33.20 | ROUTER (IPv4 NETWORK→IPv4 TUNNEL) | 0 | 2 | 1 | 1 | 0 | 0 | 0 | TAKING OUT TUNNELED IPv4 (PRIVATE) FROM IPv4 GLOBAL NETWORK |
| ETC. | | 0 | 0 | 0 | 0 | 0 | 0 | 0 | |
| NOTE | PROCESSING PROTOCOL: 1=IPv4 PROCESSING, 2=IPv6 PROCESSING, 3=PPP PROCESSING, 4=AH AUTHENTICATION PROCESSING, 5=ESP DECRYPTION, 6=UDP PROCESSING, 7=L2TP PROCESSING | | | | | | | | |

FIG.3

| SOURCE IP ADDRESS (32 BITS) | PROTOCOL ATTRIBUTE | PROCESSING ORDER HEADER INFORMATION | | PROTOCOL PROCESSING ORDER (PROCESSING PROTOCOL) | | | | | | NOTE |
|---|---|---|---|---|---|---|---|---|---|---|
| | | PRESENT NUMBER OF PROTOCOL PROCESSINGS | TOTAL NUMBER OF PROTOCOL PROCESSINGS | | | | | | | |
| 255.255.255.0 | LNS (L2TP) | 0 | 5 | 1 | 6 | 7 | 3 | 1 | | |
| 1.2.3.4 | LAC (L2TP) | 0 | 4 | 1 | 6 | 7 | 3 | 0 | | |
| 202.243.37.74 | SECURITY GATEWAY (IPsec AH AUTHENTICATION) | 0 | 2 | 4 | 1 | 0 | 0 | 0 | | |
| 61.22.33.44 | SECURITY GATEWAY (IPsec ESP CIPHER) | 0 | 3 | 5 | 1 | 1 | 0 | 0 | | TUNNEL MODE |
| 61.22.33.45 | SECURITY GATEWAY (IPsecESP CIPHER) | 0 | 2 | 5 | 1 | 0 | 0 | 0 | | TRANSPORT MODE |
| 125.30.33.2 | ROUTER (IPv6→IPv4 NETWORK TUNNEL) | 0 | 1 | 1 | 0 | 0 | 0 | 0 | | TUNNELING IPv6 PACKET TO IPv4 NETWORK |
| 5.5.5.5 | ROUTER (IPv4→IPv6 NETWORK TUNNEL) | 0 | 1 | 2 | 0 | 0 | 0 | 0 | | TUNNELING IPv4 PACKET TO IPv6 NETWORK |
| 125.30.33.20 | ROUTER (IPv6 NETWORK→IPv4 TUNNEL) | 0 | 2 | 2 | 1 | 0 | 0 | 0 | | TAKING OUT TUNNELED IPv4 FROM IPv6 NETWORK |
| 5.5.5.50 | ROUTER (IPv4 NETWORK→IPv6 TUNNEL) | 0 | 2 | 1 | 2 | 0 | 0 | 0 | | TAKING OUT TUNNELED IPv6 FROM IPv4 NETWORK |
| 125.30.33.20 | ROUTER (IPv4 NETWORK→IPv4 TUNNEL) | 0 | 2 | 1 | 1 | 0 | 0 | 0 | | TAKING OUT TUNNELED IPv4 (PRIVATE) FROM IPv4 GLOBAL NETWORK |
| ETC. | | 0 | 0 | 0 | 0 | 0 | 0 | 0 | | |

NOTE: PROCESSING PROTOCOL:1=IPv4 PROCESSING, 2=IPv6 PROCESSING, 3=PPP PROCESSING, 4=AH AUTHENTICATION PROCESSING, 5=ESP DECRYPTION, 6=UDP PROCESSING, 7=L2TP PROCESSING

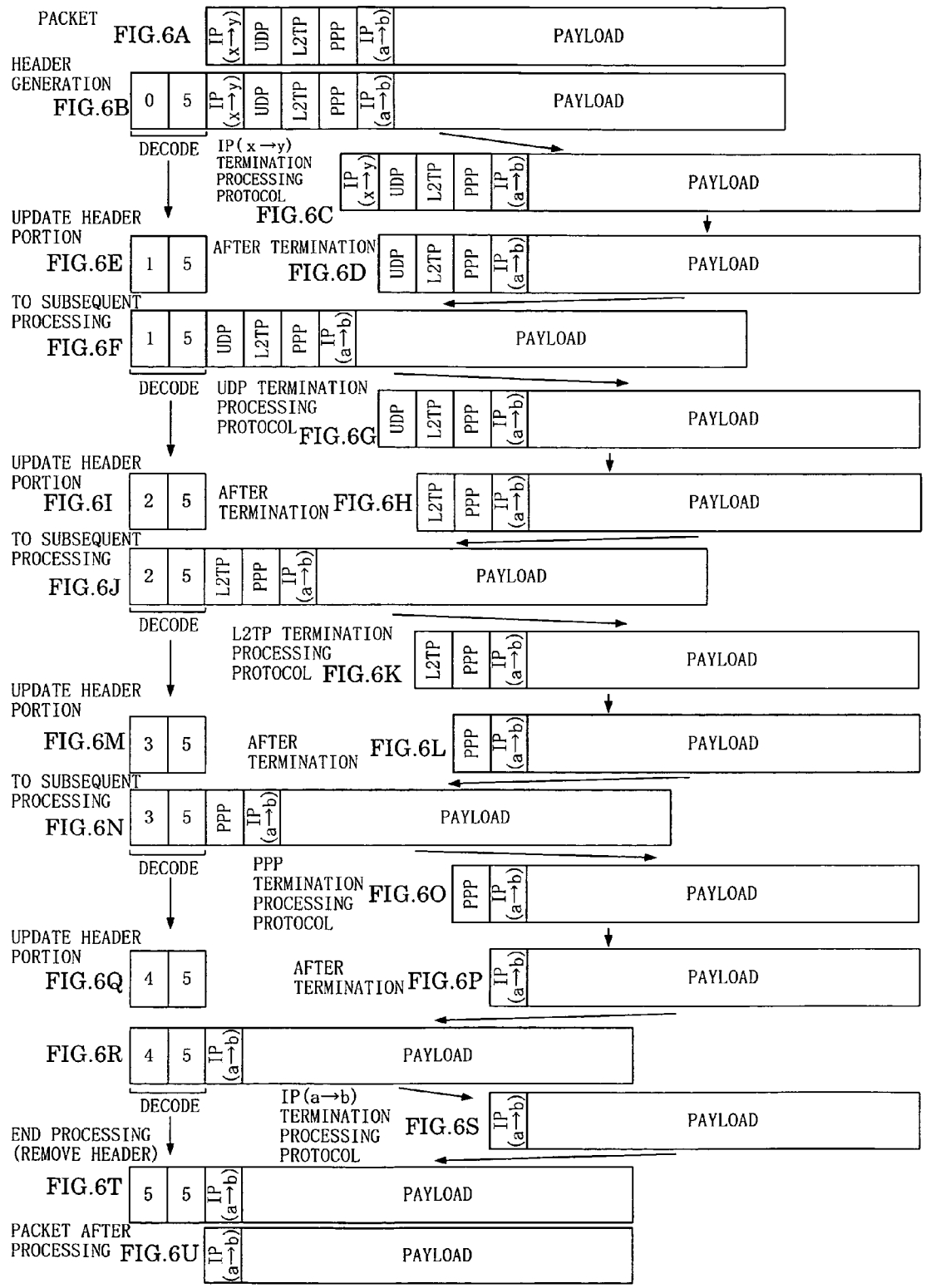

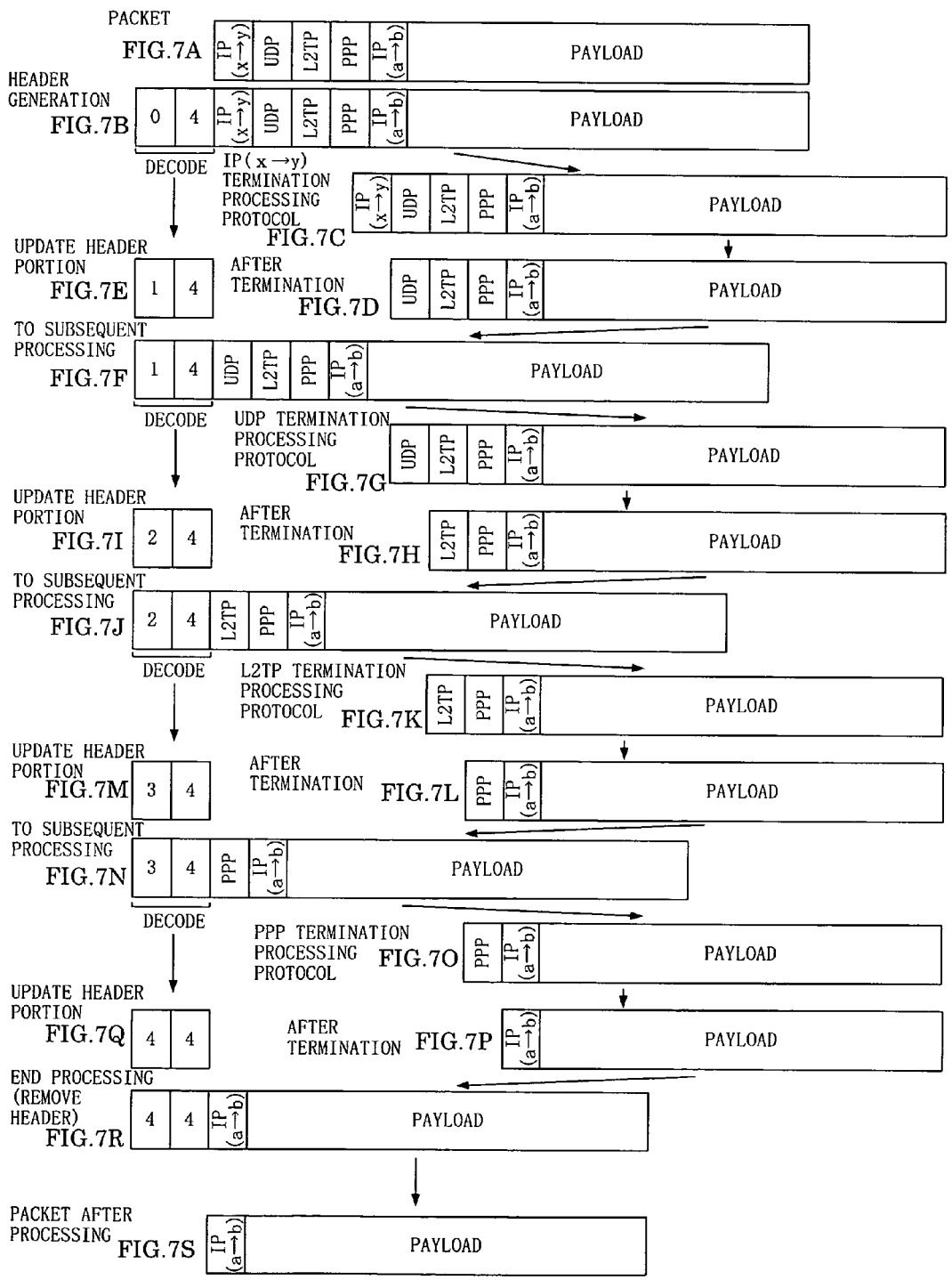

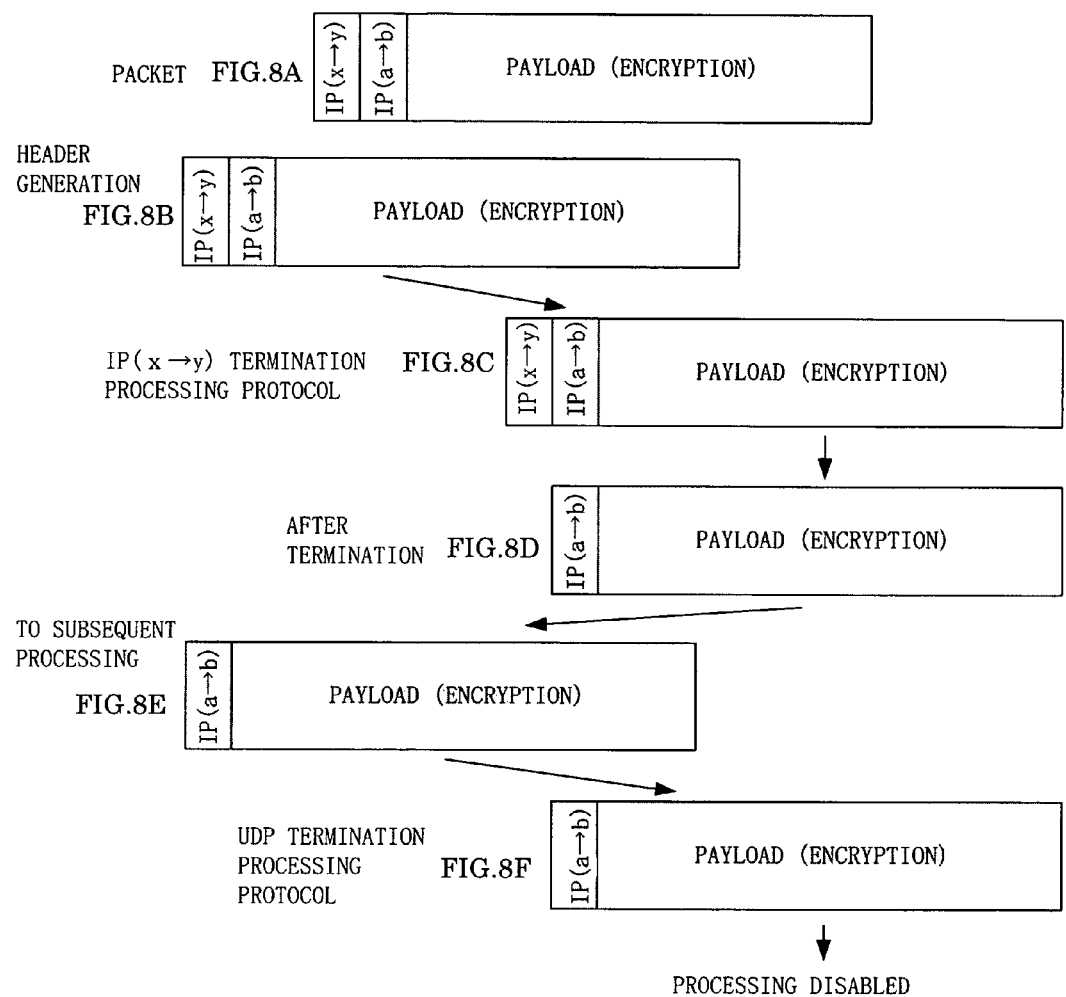

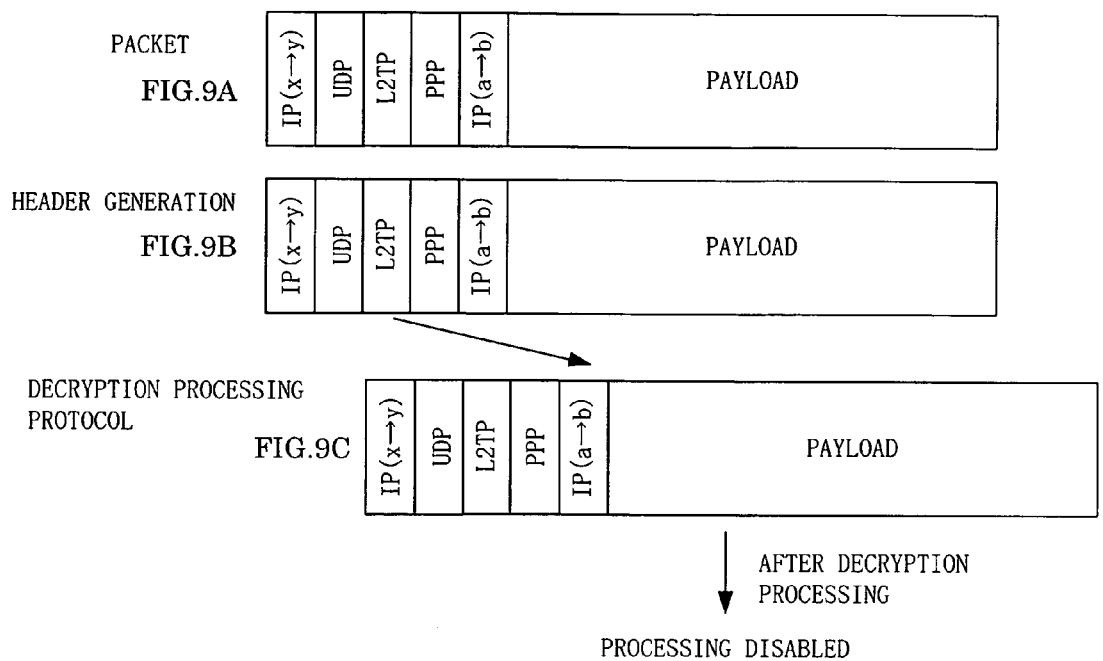

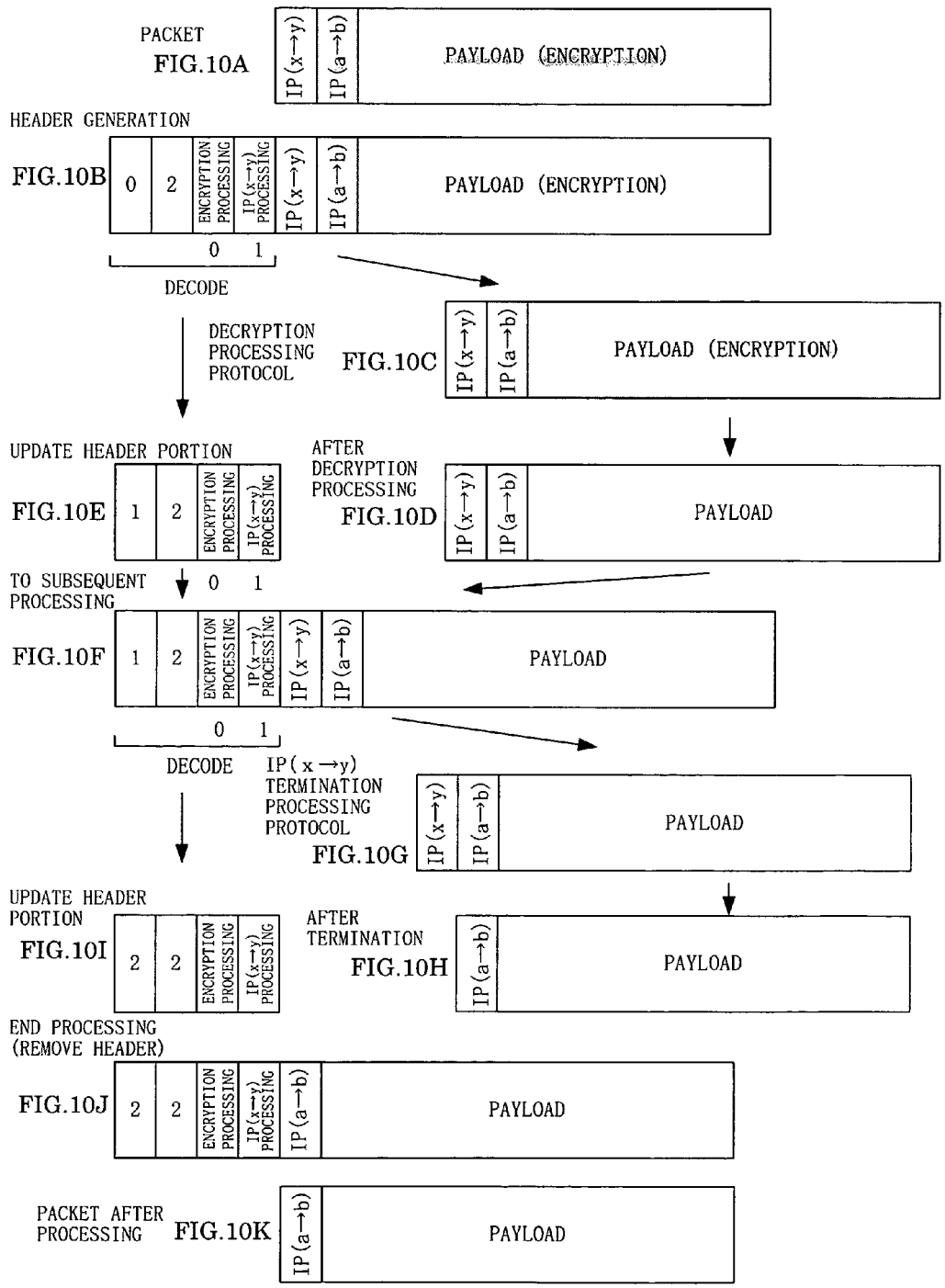

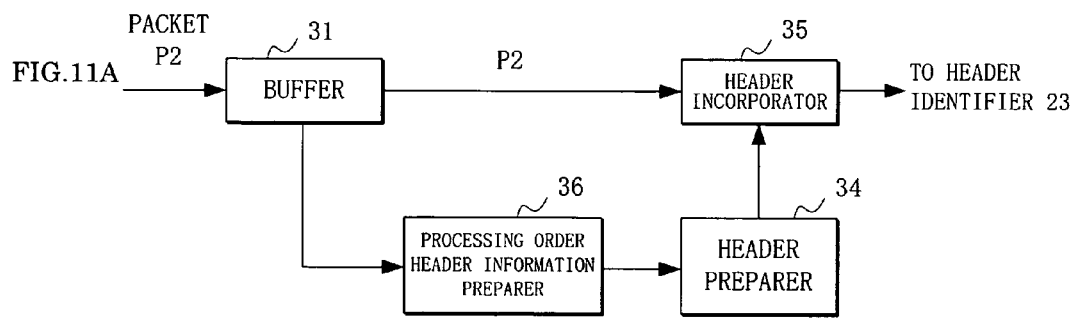
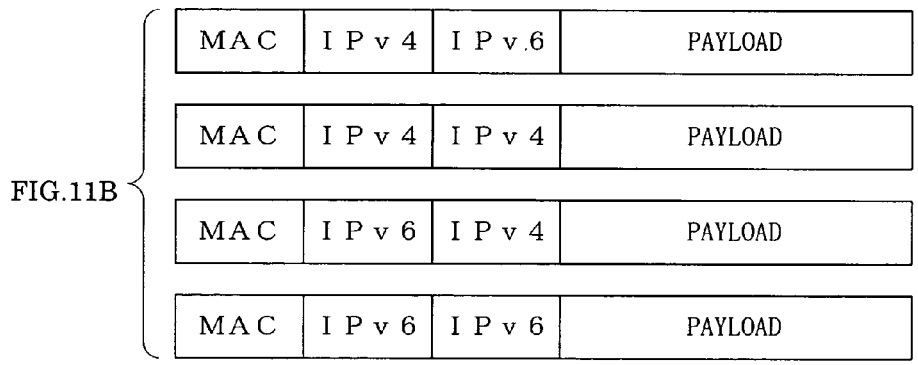

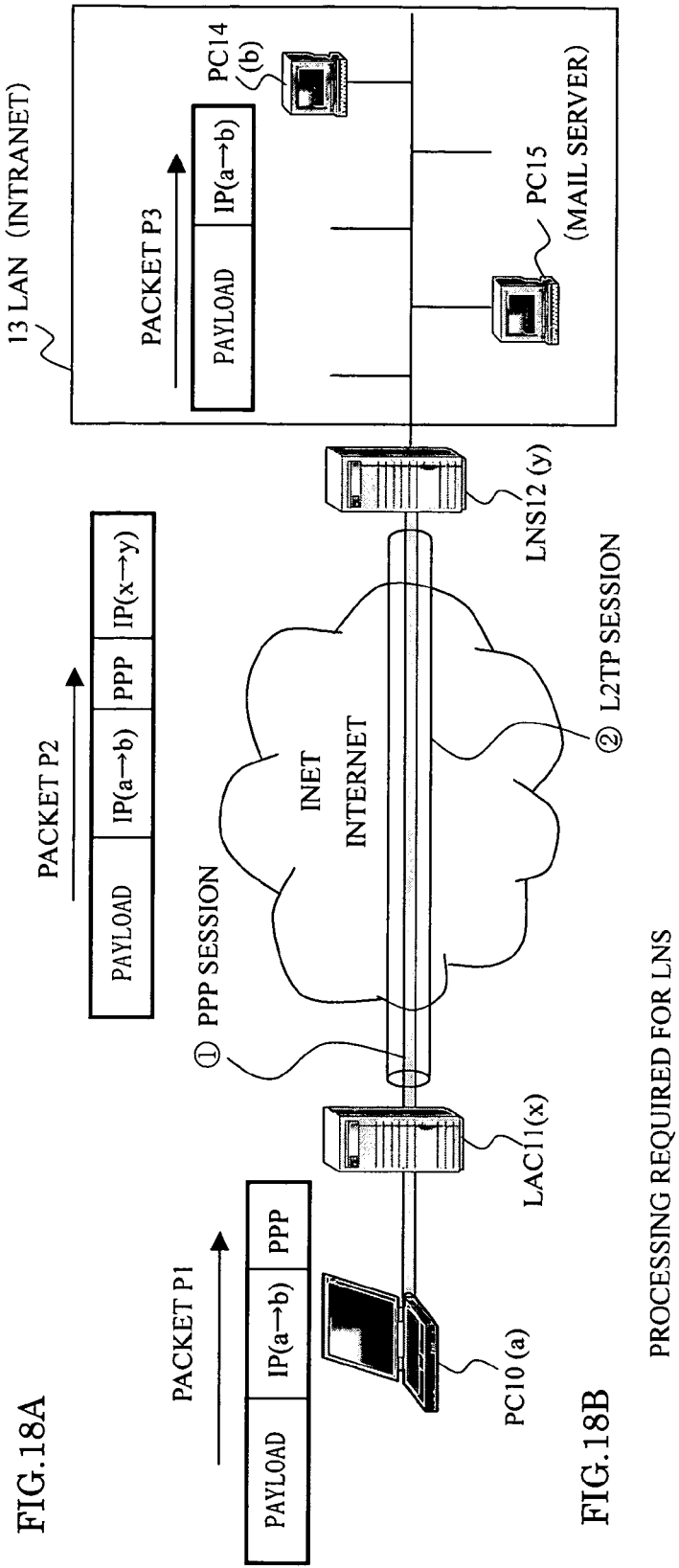

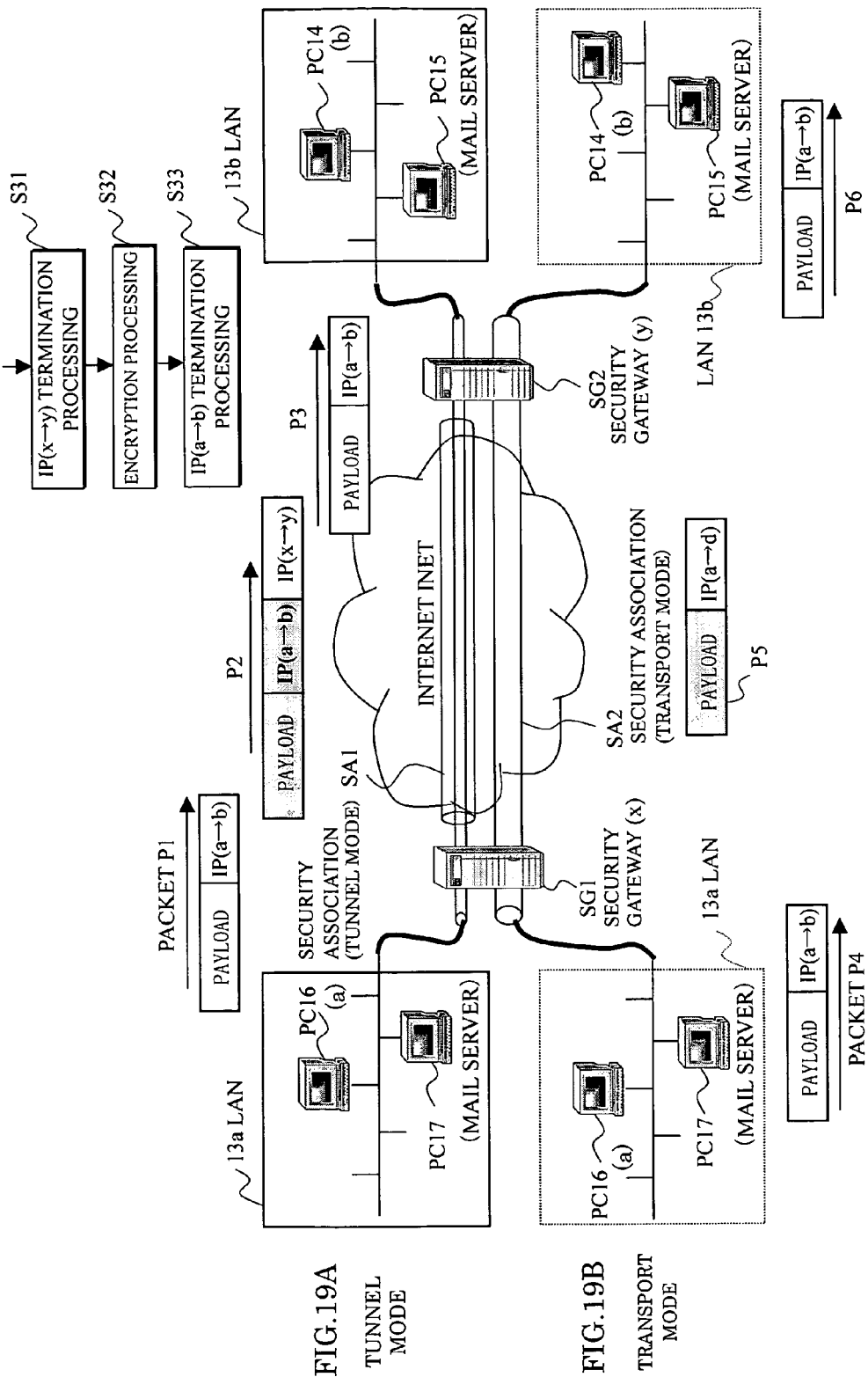

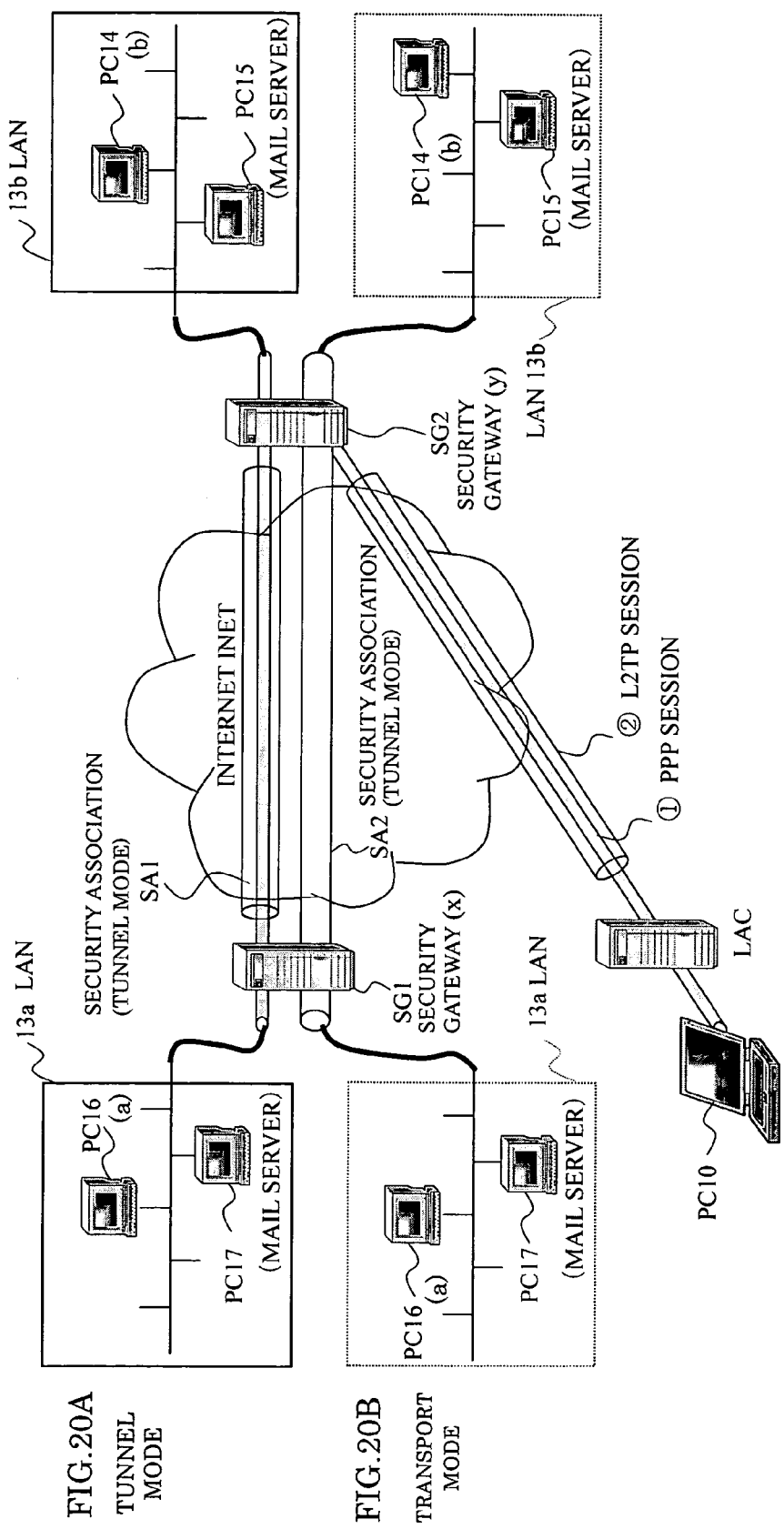

COMMUNICATION DEVICE

CROSS-REFERENCE TO RELATED APPLICATION

The present application is a continuation of International Application No. PCT/JP02/02001 which was filed on Mar. 5, 2002.

BACKGROUND OF THE INVENTION

1. Field of the Invention

The present invention relates to a communication device, and in particular to a communication device which transmits/receives data by using a communication protocol.

A protocol is a rule which defines a communication method, and is composed of an OSI reference model of seven layers in total. In each layer, processing information in compliance with each protocol is added as a header to transmission data received from an upper layer and is transferred to a lower layer. Also, the header added is extracted from data received from the lower layer, processing in compliance with the processing information is executed, and the data are transferred to the upper layer.

An individual communication device accommodates to only a single protocol. If various protocols need to be realized, it is required to prepare communication devices accommodating to each of the protocols. However, this method leads to much trouble and cost. Accordingly, means for realizing all kinds of protocols more easily are demanded.

2. Description of the Related Art

FIG. 18A shows a well-known conventional communication system connected through the Internet. In FIG. 18A, a reference numeral 10 indicates a personal computer (hereinafter, abbreviated as PC), a reference numeral 11 indicates an L2TP Access Control (hereinafter, abbreviated as LAC), a reference numeral 12 indicates an L2TP Network Server (hereinafter, abbreviated as LNS), and a reference numeral 13 indicates a LAN (Local Area Network) as an intranet. A PC 14 and a PC 15 as a mail server are provided in the LAN 13.

When transmitting a packet P1 to the PC 14 within the LAN 13 in such a communication system, the PC 10 generates an IP(a→b) frame in which an IP address (a) of the PC 10 which is a source, and an IP address (b) of the PC 14 which is a destination, are added to a payload, and transmits the packet P1 in which the IP(a→b) frame is capsuled with a PPP (Point To Point) protocol, in order to establish a connection with the LAC 11 provided by an ISP (Internet Service Provider).

In order to further transmit the PPP protocol packet received from this connection to the LNS 12, the LAC 11 transmits a packet P2 (capsuled with IP(x→y) protocol) in which an IP address (x) of the LAC 11 which is a source, and an IP address (y) of the LNS 12 which is a destination are added to the packet P1, to the LNS 12 on the destination network through a tunnel of the Internet INET.

The LNS 12 having received the packet P2 transmits to the LAN 13 a packet P3, to which decapsuling or removing the IP addresses of the LAC 11 and the LNS 12 from the packet P2 is performed.

The packet P3 is transmitted to the mail server PC 15 through the LAN 13, and the PC 15 transfers the packet P3 to the destination PC 14 to complete a data transmission.

Accordingly, the LNS 12 requires, as shown in FIG. 18B, IP(x→y) termination processing (at step S21), PPP termination processing (at step S22), and IP(a→b) termination processing (at step S23).

In a PPP protocol session ① of PC 10→KLNS 12 in this case, a user of the PC 10 has established a connection with a NAS (Network Access Server)(not shown) provided by an ISP with dial-up means or the like. Upon accessing the LAN 13 from remote sites such as foreign countries, dial-up accesses have to be performed to a PPP server within the LAN 13, which leads to a cost increase.

In FIGS. 19A and 19B, an intranet LAN 13a is connected to an intranet LAN 13b by using security gateways SG 1 and SG 2 instead of the LAC and the LNS of FIG. 18A. For this connection, a tunnel mode shown in FIG. 19A and a transport mode shown in FIG. 19B can be conceived.

Firstly, in case of the tunnel mode (1), the packet P1 is transmitted to the security gateway SG 1 with the IP(a→b) protocol from a PC 16 of the address (a) in the LAN 13a. The security gateway SG 1 encrypts the received packet P1 as shown by hatching, and capsules the packet P1 with the IP(x→y) protocol to be transmitted to the security gateway SG 2 through the tunnel of a security association SA 1 on the Internet INET.

In the security gateway SG 2, as shown in FIG. 19C, an IP(x→y) termination processing (at step S31) is firstly performed, encryption processing is further performed (at step S32), and then the packet 3 from which the IP(x→y) protocol is removed (decapsuled) is transmitted to the LAN 13b. In the LAN 13b, according to the IP(a→b) termination processing protocol in the packet P3, the packet P3 is transmitted to the PC 14 of the address (b).

In case of the transport mode (2), a packet P4 is transmitted to the PC 14 in the opposed LAN 13b from the PC 16. The packet P4 is subjected to encryption processing to the payload in the security gateway SG 1, and then is transmitted to the PC 14 of the address (b) in the LAN 13b through the Internet INET and the security gateway SG 2 (security association SA 2).

In such a communication system using security gateways shown in FIGS. 19A and 19B, the security gateway SG 2 can accommodate to the security association (tunnel mode) SA 1 and the security association (transport mode) SA 2 which perform processing shown in FIG. 19C, but can not accommodate to the other modes.

This is shown in FIGS. 20A and 20B. Namely, when the PC 10 and the LAC 11 shown in FIG. 18A are connected to the security gateway SG 2 with the PPP session ① or the L2TP session ②, the packet from the LAC 11 is required to be processed as the LNS as shown in FIGS. 18A and 18B, and IPsec (IP security) protocol processing is required to be performed to the packet from the security gateway SG 1 as the security gateway.

The LNS processing requires a protocol processing order of IP, UDP, L2TP, PPP, and IP (see FIG. 3). Since the security gateway SG 2 requires the order of the ESP decryption and the IP processing (see FIG. 3), these processings can not be executed when a communication device is provided with only a fixed protocol.

The PPP session, the L2TP session, and the security association modes have been taken as examples for the description in the above-mentioned case, while other various kinds of capsuling exist.

FIGS. 21A-21Q show examples of such various capsuling. FIG. 21A shows a standard Ethernet protocol, FIG. 21B shows an Ethernet protocol in a mobile terminal and a base station, FIG. 21C shows a protocol used for a PPPoE (ADSL etc.), FIGS. 21D and 21E show a combination protocol of an L2.5 Ethernet and an MPLS (Multiprotocol Label Switching).

Furthermore, FIG. 21F is a protocol for tunneling at an MAC layer, FIG. 21G is an L2TP protocol, FIG. 21H is a protocol for authentication (tunnel mode), FIG. 21I is a protocol for authentication (transport mode), FIG. 21J is a protocol for encryption (tunnel mode), FIG. 21K is a protocol for encryption (transport mode), FIG. 21L is a protocol indicating a key exchange, FIG. 21M is a protocol for tunneling at an IP layer, FIG. 21N is a protocol for tunneling at an IP layer, FIG. 21N is a protocol for tunneling with an IPv6 in an IPv4 network, FIG. 21O is a protocol of IPv6 extension header or the like, FIG. 21P is a protocol for tunneling of a global address/private address, and FIG. 21Q is a protocol for tunneling with an IPv4 in an IPv6 network.

Since the conventional communication device to which such various capsuled packets are inputted is provided with only a fixed protocol, it can not accommodate flexibly.

Also, in the conventional IPv4 and IPv6 processing as shown in FIG. 22C the IP processing is performed in the order of L2, L3, and L4or in the reverse order as shown in FIGS. 22A and 22B, so that capsuling only in such an order can be processed (protocol conversion can not be performed). Therefore, when there is another order processing, the need for preparing for the other order processing or for another hardware arises.

Furthermore, L3 processing is performed twice in the above example. However, unless a processing order of hardware-like protocols is preliminarily fixed, it has been impossible to design the protocols. Also, even if processing orders of protocols as many as one can conceive are incorporated, there has been a problem that the processing order of protocols which are not used has also to be designed.

SUMMARY OF THE INVENTION

It is accordingly an object of the present invention to provide a communication device which can realize a protocol conversion as a unit without preparing respective packages for existing various protocols.

In order to achieve the above-mentioned object, the communication device according to the present invention comprises: a protocol processing order data generator which detects a protocol attribute included in a packet received and generates protocol processing order data indicating a protocol processing order based on the protocol attribute; and a protocol converter which individually processes a plurality of protocols within the received packet based on the protocol processing order data (claim 1).

Namely, in the communication device according to the present invention, a protocol processing order data generator detects a protocol attribute from a packet received. This protocol attribute comprises an IP address of a transmitting source or a destination (claim 13). The protocol processing order data generator generates protocol processing order data indicating a protocol processing order based on the protocol attribute.

A protocol converter processes a plurality of protocols set in the received packet based on the protocol processing order data received from the protocol processing order data generator.

Since what the protocol attributes included in the received packet are like can be determined, the protocol processing order data can be generated for any of the received packet if only protocols corresponding to the protocol attributes are prepared, and the protocols within the received packet can be individually processed based on the protocol processing order data. Therefore, a plurality of protocol conversions can be realized by a single device.

Accordingly, a packet transmitted with e.g. an IPv6 protocol can be transmitted/received with an IPv4 protocol, thereby easily realizing a communication device requiring a plurality of protocol conversions.

Also, in the present invention, the above-mentioned protocol processing order data generator may generate a total number of protocol processings corresponding to the protocol attribute as the protocol processing order data, and the protocol converter may sequentially process the protocols set in the received packet from the head by the total number of protocol processings (claim 2).

Namely, the protocol processing order data generator generates a total number of protocol processings corresponding to the protocol attribute as the protocol processing order data, and the protocol converter sequentially processes the protocols set in the received packet from the head based on the total number of protocol processings.

Accordingly, when the protocol attribute indicates that the protocols within the received packet are sequentially processed from the head, all of the protocols can be normally processed if the protocols within the received packet are sequentially processed from the head by the total number of protocol processings.

Also, in the present invention, the protocol processing order data generator may comprise a header adder which adds to the received packet a header including a total number of protocol processings as the protocol processing order data, the protocol converter may be provided with a protocol processor which individually processes the protocols, a header identifier which identifies the header and makes the protocol processor sequentially process the protocols within the received packet from the head, and a counter which counts a number of protocol processings at the protocol processor; and the header identifier may finish protocol processing when the number of protocol processings reaches the total number of protocol processings (claim 3).

Namely, in this case, a header including a total number of protocol processings as the protocol processing order data is added to the received packet and transmitted to the protocol converter. The protocol converter identifies the header at a header identifier and makes the protocol processor sequentially process the protocols within the received packet from the head, and a counter counts the then protocol processing number.

The header identifier finishes the protocol processing when the number of protocol processings by the counter reaches the above-mentioned total number of protocol processings.

Also, in the present invention, the protocol processing order data generator may comprise a header adder which adds to the received packet a header including a total number of protocol processings as the protocol processing order data, the protocol converter may be provided with a protocol processor which individually processes the protocols, a header processor which identifies the header and makes the protocol processor sequentially process the protocols within the received packet from the head, and a processing completer which accumulates a number of protocol processings at the header processor and which finishes protocol processing when the number of protocol processings reaches the total number of protocol processings (claim 4).

In this case, a header including a total number of protocol processings is added to the received packet and is transmitted to the protocol converter in the same way as the above. However, this case is different from the above-mentioned case in that the number of protocol processings when the header processor identifies the above-mentioned header and makes the protocol processor sequentially process the protocols within the received packet from the head is accumulated in a processing completer. The processing completer finishes the protocol processing when the number of protocol processings reaches the total number of protocol processings.

Also, in the present invention, the protocol processing order data may include a total number of protocol processings, and the protocol converter may be provided with a protocol processor which individually processes the protocols, a data standby portion which makes the received packet stand by, and a processing order controller which makes the protocol processor sequentially process protocols within the received packet in the data standby portion from the head based on the protocol processing order data, which accumulates a number of protocol processings at the protocol processor, and which finishes protocol processing when the number of protocol processings reaches the total number of protocol processings (claim 5).

Namely, in this case, a processing order controller in the protocol converter makes the protocol processor sequentially process protocols from the head within the received packet made stand by at the standby portion based on the total number of protocol processings as the protocol processing order data.

The processing order controller accumulates the number of protocol processings at the protocol processor and finishes the protocol processing when the number of protocol processings reaches the above-mentioned total number of protocol processings Also, in the present invention, when the protocol attribute indicates that the protocols are not processed sequentially from the head but require a predetermined processing order corresponding to the protocol attribute, the protocol processing order data generator may generate the protocol processing order data that are the total number of protocol processings to which the predetermined processing order is added, and the protocol converter may process the protocols by the total number of protocol processings according to the predetermined processing order (claim 6).

Namely, when the protocol attribute indicates, different from the above, that not sequential processing of the protocols from the head but a predetermined processing order corresponding to the protocol attribute is required, only the total number of protocol processings is not enough for the protocol processing order data.

Therefore, the protocol processing order data generator generates protocol processing order data in which the above-mentioned predetermined processing order is added to the total number of protocol processings. According to the predetermined processing order, the protocol converter executes protocols within the received packet by the total number of protocol processings.

Thus, even when the protocols included in the received packet are not sequentially processed from the head, if only the predetermined processing order corresponding to the protocol attribute is prepared, the protocol conversion can be realized by executing processings by the total number of protocol processings according to the predetermined processing order.

Also, in the present invention, the protocol processing order data generator may comprise a header adder which adds to the received packet a header including a total number of protocol processings and a predetermined processing order corresponding to the protocol attribute as the protocol processing order data, the protocol converter may be provided with a protocol processor which individually processes the protocols, a header identifier which identifies the header and makes the protocol processor process the protocols within the received packet in the predetermined processing order, and a counter which counts a number of protocol processings at the protocol processor; and the header identifier may finish protocol processing when the number of protocol processings reaches the total number of protocol processings (claim 7).

Namely, in the above-mentioned claim 3, a header including a predetermined processing order corresponding to not only the total number of protocol processings but also a protocol attribute is added to the received packet. The protocol converter does not process the protocols within the received packet sequentially from the head as in the claim 3 but makes the protocol processor process the protocols according to the above-mentioned predetermined processing order.

The number of protocol processings at the protocol processor is counted by a counter, the number of protocol processings counted is compared with the above-mentioned total number of protocol processings, and when both are coincident with each other, the header identifier finishes the protocol processing.

In the present invention, the protocol processing order data generator may comprise a header adder which adds to the received packet a header including a total number of protocol processings and a predetermined processing order corresponding to the protocol attribute as the protocol processing order data, and the protocol converter may be provided with a protocol processor which individually processes the protocols, a header processor which identifies the header and makes the protocol processor process the protocols within the received packet in the predetermined processing order, and a processing completer which accumulates a number of protocol processings at the header processor and which finishes protocol processing when the number of protocol processings reaches the total number of protocol processings (claim 8).

Namely, in this case, assuming that a predetermined execution order corresponding to the protocol attribute is required, the header including the predetermined processing order and the total number of protocol processings is added to the received packet to be transmitted to the protocol converter.

In the protocol converter, the header processor makes the individual protocol processor execute the protocols within the received packet in the predetermined processing order, the processing completer accumulates the number of protocol processings at this time and finishes the protocol processing when the number of protocol processings reaches the total number of protocol processings.

Also, in the present invention, the protocol processing order data may include a total number of protocol processings and a predetermined processing order corresponding to the protocol attribute, and the protocol converter may be provided with a protocol processor which individually processes the protocols, a data standby portion which makes the received packet stand by, and a processing order controller which makes the protocol processor process protocols within a received packet in the data standby portion in a predetermined processing order, based on the protocol processing order data, which accumulates a number of protocol processings at the protocol processor, and which finishes protocol processing when the number of protocol processings reaches the total number of protocol processings (claim 9).

Namely, also in this case, assuming that a predetermined processing order corresponding to the protocol attribute is required, the processing order controller in the protocol converter makes the protocol processor execute the protocols within the received packet made stand by at the standby portion based on the protocol processing order data in the predetermined order.

The processing order controller accumulates the number of protocol processings at the protocol processor and finishes the protocol processing when the number of protocol processings reaches the total number of protocol processings.

It is to be noted that when the protocol attribute indicates a security gateway, the predetermined processing order may include encryption processing (claim 10).

Furthermore, the above-mentioned header identifier may identify a corresponding protocol and may make a corresponding individual protocol processor process the protocol (claim 11).

Also, the above-mentioned header processor may have a header identifier per protocol, and each header identifier may identify a corresponding protocol and may make a corresponding protocol processor process the protocol (claim 12).

Furthermore, the above-mentioned protocol processing order data generator may have a table associating the protocol attribute with the protocol processing order data (claim 14).

Furthermore, the above-mentioned protocol converter may have a remover which removes the protocol processing order data after protocol processing (claim 14).

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIG. 3 is a diagram showing a protocol attribute table in the header adder shown in FIG. 2;

FIGS. 6A-6U are diagrams showing a processing sequence of an LNS which only controls the number of protocol processings in each embodiment of a communication device according to the present invention;

FIGS. 7A-7S are diagrams showing a processing sequence of an LAC which only controls the number of protocol processings in each embodiment of a communication device according to the present invention;

FIGS. 8A-8F are sequence diagrams (1) for illustrating problems in case where a protocol conversion is performed only by the total number of protocol processings shown in FIGS. 6A-6U and FIGS. 7A-7S;

FIGS. 9A-9C are sequence diagrams (2) for illustrating problems in case where a protocol conversion is performed only by the total number of protocol processings shown in FIGS. 6A-6U and FIGS. 7A-7S;

FIGS. 10A-10K are sequence diagrams showing an embodiment in case where a predetermined processing order is added to a header besides the total number of protocol processings mentioned above;

FIGS. 11A and 11B are block diagrams for illustrating an embodiment (2) of a header adder used for an embodiment of a communication device according to the present invention;

FIGS. 18A and 18B are diagrams of a communication system showing a PPP session and an L2TP session through the Internet generally known;

FIGS. 19A-19C are diagrams of a communication system showing a tunnel mode and a transport mode when an IPsec packet is transmitted through the Internet;

FIGS. 20A and 20B are diagrams for pointing out problems in case where the PPP session and the L2TP session shown in FIG. 18A are added to FIGS. 19A-19C;

DESCRIPTION OF THE EMBODIMENTS

Embodiment (1)

Figure 1:
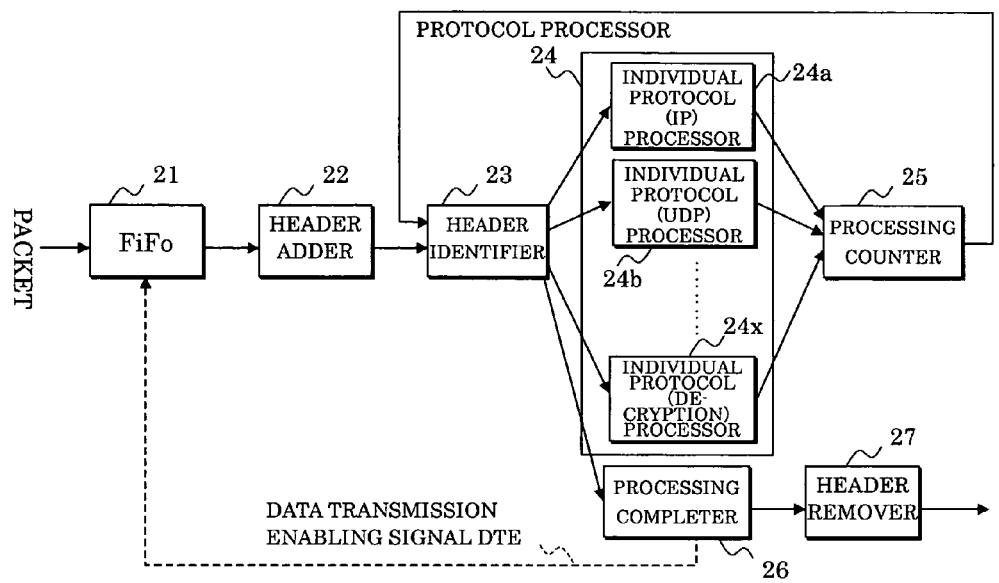
FIG. 1 is a block diagram showing an embodiment (1) of a communication device according to the present invention.

FIG. 1 shows an embodiment (1) of a communication device according to the present invention applied to the LNS 12 shown in FIG. 18A and the security gateway SG 2 shown in FIGS. 19A and 19B. This communication device is provided with a FiFo 21 which latches a packet received from the Internet or the like, a header adder 22 which adds a header to the received packet outputted from the FiFo 21, a header identifier 23 which inputs the received packet with header outputted from the header adder 22 to identify the header, a protocol processor 24 having individual protocol processors 24a-24x corresponding to the protocols identified by the header identifier 23, a processing counter 25 which counts the number of processings upon processing protocols at the protocol processor 24, a processing completer 26 which is notified that the header identifier 23 has determined the completion of the processing of the received packet as a result of providing the number of processings to the header identifier 23 by the counter 25, and a header remover 27 which removes the header from the received packet upon processing completion. A data transmission enabling signal DTE is provided to the FiFo 21 from the processing completer 26

Figure 2:
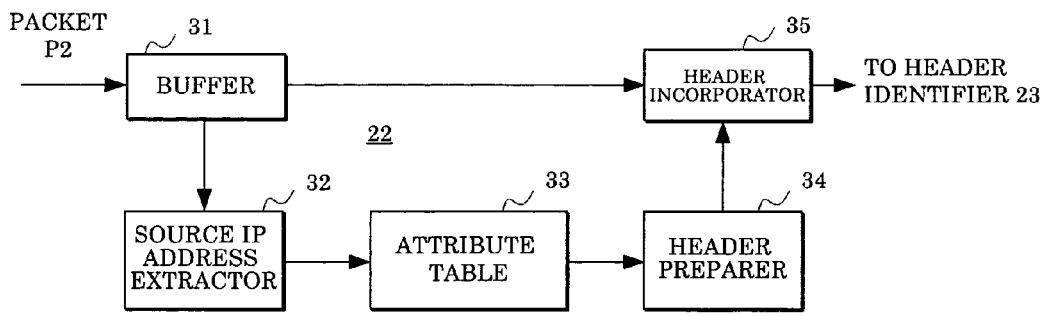
FIG. 2 is a block diagram showing an embodiment (1) of a header adder used for a communication device according to the present invention.

FIG. 2 shows an embodiment (1) of the header adder 22 shown in FIG. 1. This header adder 22 is composed of a buffer 31 which stores the packet P2 (see packet P2 of FIG. 18A and FIGS. 19A and 19B) from the FiFo 21, a source IP address extractor 32 which extracts a source IP address in the packet P2 stored in the buffer 31, a protocol attribute table 33 which outputs processing order header information based on the source IP address extracted by the source IP address extractor 32, a header preparer 34 which prepares a header based on the processing order header information from the table 33, and a header incorporator 35 which inputs the packet P2 from the buffer 31 and incorporates the header from the header preparer 33.

FIG. 3 shows an embodiment of the protocol attribute table 34 shown in FIG. 2. As shown in FIG. 3, this table is composed of the source IP address (32 bits), a protocol attribute, and the processing order header information. From the source IP address, the number of protocol processings, the total number of protocol processings, and a protocol processing order are read as the processing order header information.

It is to be noted that the same table can be obtained by using a destination IP address instead of the source IP address.

Figure 4:
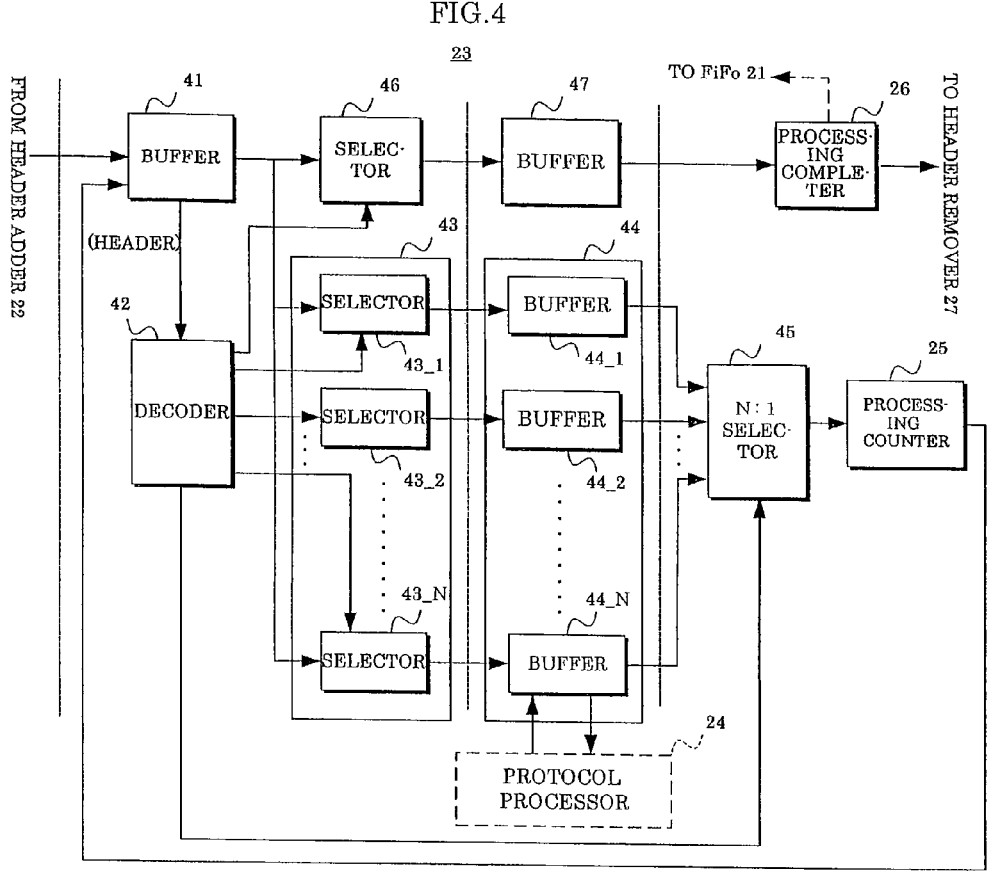
FIG. 4 is a block diagram showing an embodiment of a header identifier used for the embodiment (1) of a communication device according to the present invention.

FIG. 4 shows an embodiment of the header identifier 23 shown in FIG. 1. In this embodiment, a received packet, from the header adder 22, to which a header is added is stored in a buffer 41, and only the header therein is provided to a decoder 42. The decoder 42 is connected to a selector 43 composed of N units of selectors 43_1-44_N, which are individually connected to a buffer 44 composed of the same N units of buffers 44_1-44_N.

These buffers 44_1-44_N are respectively connected to the individual protocol processors 24a-24x (see FIG. 1) which compose the protocol processor 24. Outputs of the buffer 44 are connected to a N:1 selector 45, one output thereof is selected by the control of the decoder 42, the processing counter 25 is counted up, and the result (header) is returned to the buffer 41.

Also, the received packet is transmitted to a buffer 47 from the buffer 41 through a selector 46 controlled by the decoder 42. Then, the packet is transmitted to the header remover 27 from the buffer 47 through the processing completer 26.

Figure 5:
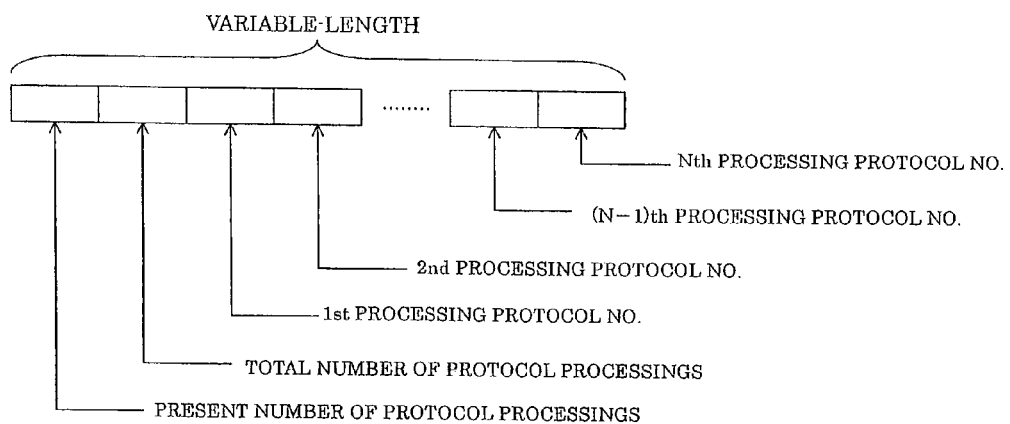
FIG. 5 is a diagram showing an embodiment of a header added to a received packet as protocol processing order data used for a communication device according to the present invention.

FIG. 5 shows an embodiment of a header prepared by the header preparer 36 shown in FIG. 2. A variable length header is composed in which the "present number of protocol processings", the "total number of protocol processings", and N units of "processing protocol No." in the attribute table shown in FIG. 3 are arranged in series.

FIGS. 6A-6U show a sequence of protocol conversion processing when the embodiment of FIG. 1 is incorporated into the LNS shown in FIG. 18A. Hereinafter, the operation of the embodiment (1) shown in FIGS. 1-5 will be described referring to FIGS. 6A-6U.

Firstly, a packet from the Internet or the like shown in FIG. 6A is received by the FiFo 21, and is further transmitted to the header adder 22. The header adder 22 extracts, as shown in FIG. 2, the source IP address of the received packet by the source IP address extractor 32 through the buffer 31.

In case where the source IP address of this received packet is "255.255.255.0" as shown in FIG. 3, it is recognized that its protocol attribute is the LNS (L2TP) as shown in the attribute table 33.

Accordingly, a header composed of the total number of protocol processings "5" and the present number of protocol processings "0", from the attribute table 33 based on the source IP address, is prepared by the header preparer 34, and is incorporated into the received packet by the header incorporator 35 to form the received packet to which the header is added as shown in FIG. 6B.

To a payload of this received packet, as shown in FIG. 6B, protocols of IP(x→y), UDP, L2TP, PPP, and IP(a→b) are additionally set. This corresponds to "1" (IPv4 processing), "6" (UDP processing), "7" (L2TP processing), "3" (PPP processing), and "1" (IPv4 processing) indicated as the processing order header information, in case where the protocol attribute shown in FIG. 3 is LNS.

However, in this embodiment, only the total number of protocol processings and the present number of processings are added to the received packet. Accordingly, in this case, the first-Nth processing protocol Nos. are unnecessary in the header shown in FIG. 5.

The received packet to which the header is added in this way is transmitted to the header identifier 23. The received packet is firstly stored in the buffer 41, and only the header therein is taken out from the packet as shown in FIG. 6E to be provided to the decoder 42.

The decoder 42 is connected to the selectors 43 and 46 so as to control the selectors. Based on the inputted header, since the total number of protocol processings is firstly "5" and it is not coincident with the present number of protocol processings "0", the protocol processing is required to be executed. Therefore, the decoder 42 controls the selector 43 to transfer the received packet of the buffer 41 to the buffer 44.

Namely, since the decoder 42 observes the total number of protocol processings only, it is possible to designate e.g. the selector 43 sequentially from the top of selectors in FIG. 4. Accordingly, assuming that the selector 43_1 at the top of the selectors 43 is designated, the received packet from the buffer 41 is stored in the buffer 44_1 of the buffer 44 through the selector 43_1.

The received packet stored in the buffer 44_1 is processed by any of the individual protocol processors 24a-24x in the protocol processor 24 shown in FIG. 1. Assuming that the individual processor 24a corresponds to the buffer 44_1, the protocol processing is executed to the received packet by this individual protocol processor 24a.

In the LNS processing example shown in FIGS. 6A-6U, the IP termination processing is firstly executed (see FIG. 6C), and after the termination, a single protocol, i.e. the IP (x→y) protocol processing is completed as shown in FIG. 6D.

The received packet after the IP processing is provided to the processing counter 25 through the selector 45 which is also under the control of the decoder 42, the counter 25 is incremented by "1", and the header is returned to the buffer 41.

As a result, as shown in FIG. 6E, the header in which the total number of protocol processings is "5" and the present number of processings is "1" is added to the received packet at the buffer 41.

Then, the decoder 42 designates the selector 43_2, the received packet of the buffer 41 is transmitted to the buffer 44_2 through the selector 43_2, from the state of FIG. 6F, end processing by the UDP protocol processor 24b as shown in 6G is performed, and the received packet from which the UDP protocol is removed as shown in FIG. 6H can be obtained.

As a result, since the processing counter 25 is also incremented by "1" and the result is returned to the buffer 41 as a header (see FIG. 6H), the header of the decoder 42 is updated to "2" with respect to the number of protocol processings, as shown in FIG. 6I.

Hereinafter, the "L2TP processing", the "PPP processing", the "IP(a→b) processing" in the LNS processing are similarly executed as shown in FIGS. 6J-6T. When both of the total number of protocol processings and the present number of processings become "5" and are coincident with each other, as shown in FIG. 6T, it is recognized that the protocol processing has been completed.

The decoder 42 transmits the received packet of the buffer 41 this time by controlling the selector 46 to the buffer 47 to be further transmitted to the processing completer 26. The processing completer 26 transmits the subsequent data transmission enabling signal DTE to the FiFo 21, and the packet shown in FIG. 6T to the header remover 27, which outputs the packet, as shown in FIG. 6U, from which the header is removed.

It is to be noted that while the data transmission enabling signal DTE is transmitted to FiFo 21 and the subsequent received packet is captured in this embodiment, the header identifier 23 itself can capture the packet one after another.

The sequence diagram of FIGS. 7A-7S shows a control of the total number of protocol processings when the embodiment of FIG. 1 is incorporated into the LAC shown in FIG. 18A.

The processing example of FIGS. 7A-7S is different from that of FIGS. 6A-6U in that the total number of protocol processings in case of the LAC processing is "4", which is fewer than the case of LNS by "1", as known from the attribute table of FIG. 3. Accordingly, in the header generation, when the number of processings executed is supposed to be "4" and the processing is executed until the present number of processings becomes "4" as shown in FIG. 7B, the packet after the processing as shown in FIG. 7S can be obtained. Namely, the last IP(a→b) protocol processing is not executed.

The other processings are the same as FIGS. 6A-6U.

This embodiment (1) is based on the premise, as exemplified in FIGS. 6A-6U and FIGS. 7A-7S that when the header added to the received packet is composed of only the total number of protocol processings and the present number of protocol processings, the protocol processings have only to be sequentially executed from the head of the received packet, as mentioned above.

However, there are some cases where processings can not be performed only by performing the processings by the total number of protocol processings as shown in FIGS. 8A-8F and FIGS. 9A-9C.

Firstly, in the example of FIGS. 8A-8F, when the header is supposed to be generated as shown in FIG. 8B for the received packet of FIG. 8A, and when the UDP termination processing is performed to the packet of FIG. 8D from the state shown in FIG. 8E after executing the IP(x→y) termination processing protocol shown in FIG. 8C, the UDP termination processing can not be performed since the payload is encrypted.

Also, as shown in the example of FIGS. 9A-9C, when the header of FIG. 9B is supposed to be generated for the received packet of FIG. 9A, and when the decryption processing is performed to the received packet in FIG. 9C, the packet after the decryption processing can not be processed since the payload is not encrypted.

Therefore, it is necessary to add order processing data to the header when processings are performed in a predetermined order in consideration of not only the above-mentioned total number of protocol processings but also encryption processing and the like. An embodiment for this case is shown in FIGS. 10A-10K. It is to be noted that the above arrangements shown in FIGS. 1-5 can be similarly applied to the operation embodiment of FIGS. 10A-10k.

Figure 21A:
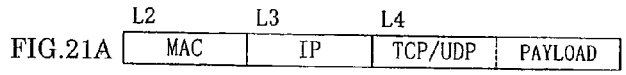
FIGS. 21A-21Q are diagrams showing an example of a conventionally known capsuled packet.
Figure 21B:
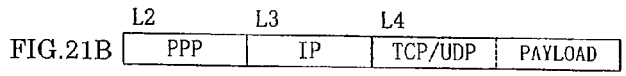
Figure 21C:
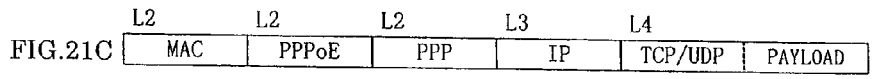
Figure 21D:
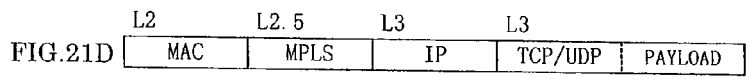
Figure 21E:
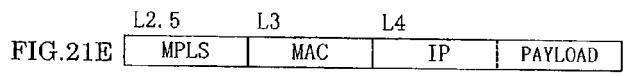
Figure 21F:
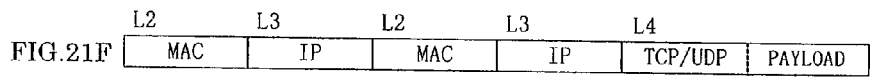
Figure 21G:
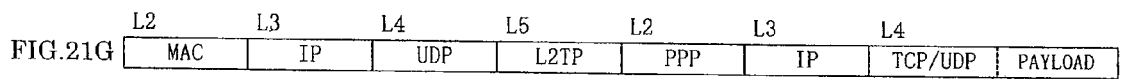
Figure 21H:
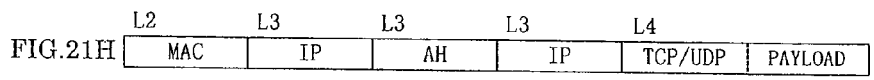
Figure 21I:
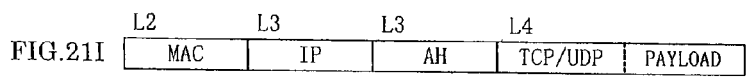
Figure 21J:
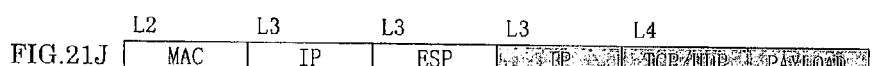
Figure 21K:
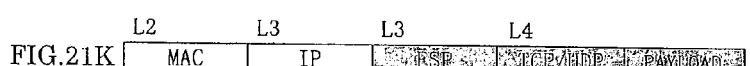
Figure 21L:
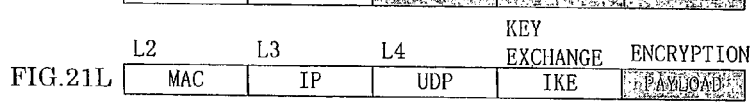
Figure 21M:
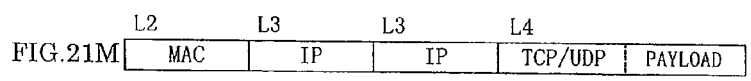
Figure 21N:
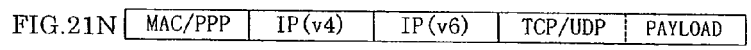
Figure 21O:
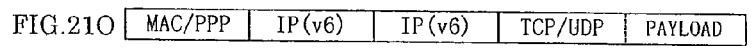
Figure 21P:
Figure 21Q:
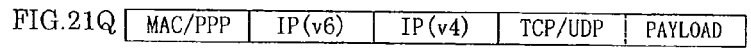
Figure 22A:
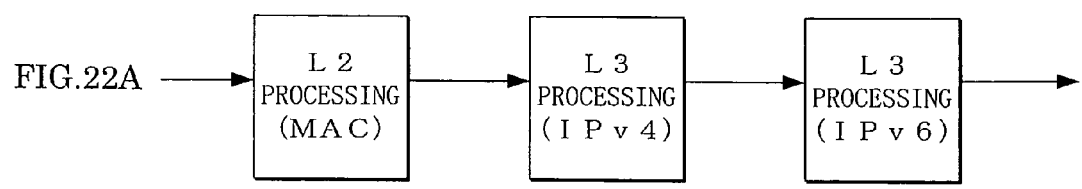
FIGS. 22A-22C are block diagrams for illustrating a conventionally known method in processing an IPv4 and an IPv6.
Figure 22B:
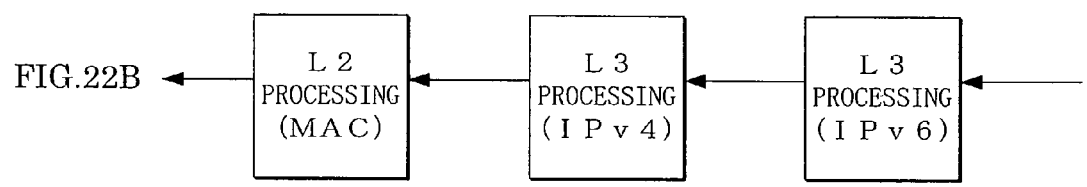
Figure 22C:
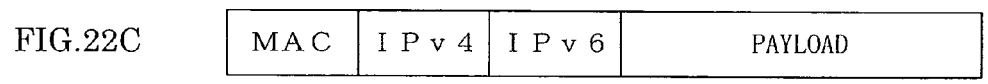

Firstly, for the received packet shown in FIG. 10A, the header adder 22 provides a header, as shown in FIG. 10B, to which not only the total number of protocol processings and the number of protocol processings but also a protocol for encryption (see FIGS. 21J, 21K, and 21L) is firstly added since the payload is encrypted as well as the IP(x→y) processing protocol is added, to the header identifier 23.

The header identifier 23 identifies the header and provides the received packet to e.g. the protocol processor 24x shown in FIG. 1 in order to perform the decryption processing firstly, thereby enabling a packet after the decryption processing shown in FIG. 10D to be obtained from the received packet shown in FIG. 10C.

The header at this time is incremented to "1" with respect to the number of protocol processings as shown in FIG. 10E.

The header and the received packet is combined at the buffer 41 as shown in FIG. 10F, and the process further proceeds to the subsequent processing as shown in FIG. 10F. Then, at another individual protocol processor, which is not shown, of the protocol processor 24, the received packet shown in FIG. 10G undergoes the IP(x→y) termination processing this time, and is decapsuled to assume the received packet shown in FIG. 10H.

The number of protocol processings of the header assumes "2" at this time as shown in FIG. 10I, which coincides with the total number of protocol processings "2". Therefore, the packet in which the header and the received packet are combined ends the processing at the processing completer 26, and the header is further removed at the header remover 27, thereby enabling the packet after the processing shown in FIG. 10K to be obtained.

FIG. 11A shows an embodiment of the header adder in a tunnel connection of an IPv4 and an IPv6. Namely, in case of this embodiment, the attribute table shown in FIG. 2 is not necessary. However, instead of the table, a processing header information preparer 36, which confirms version information in the packet received at the buffer 31 and prepares processing header information, is provided before the header preparer 34, different from the above-mentioned description.

Namely, as shown in FIG. 11B, there are only four patterns of tunnels of the IPv4 and IPv6. Therefore, if the version information is preliminarily provided to the processing order header information preparer 36, the header preparer 34 can prepare a header without the attribute table. However, it is needless to say that this is only applied to such a IPv4 or IPv6-specific packet.

Figure 12:
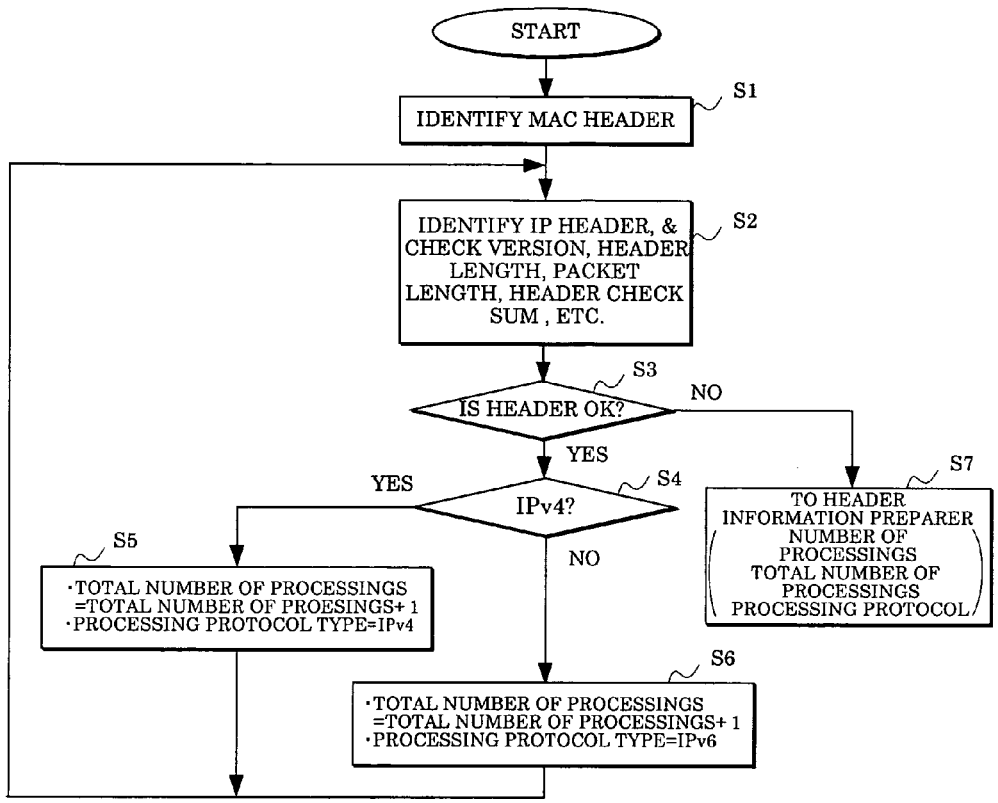
FIG. 12 is an operation flowchart of a processing order header information preparer shown in FIGS. 11A and 11B.

FIG. 12 shows an algorithm for this case. Namely, in case of the example at the top of FIG. 11B, a MAC header is firstly identified (at step S1). Then, the IP header identification, the version (v4/v6) confirmation, the header length confirmation, the packet length confirmation, the header check sum, and the like are executed (at step S2), and whether or not the header is OK is determined (at step S3).

By executing step S2, if the header is found OK at step S3, whether or not the version is the IPv4 is determined (at step S4). If it is the IPv4, the total number of protocol processings is incremented by "1", and the processing protocol is made the IPv4. If not the case, the total number of protocol processings is incremented by "1", and the processing protocol is set to the IPv6.

When the header is not OK, namely, header is all checked and the payload is detected, a protocol type and the present number of processings and the total number of protocol processings are provided to the header preparer 34. Thus, it becomes possible to incorporate the total number of protocol processings, the present number of processings, and the processing protocol to be executed into the header.

Embodiment (2)

Figure 13:
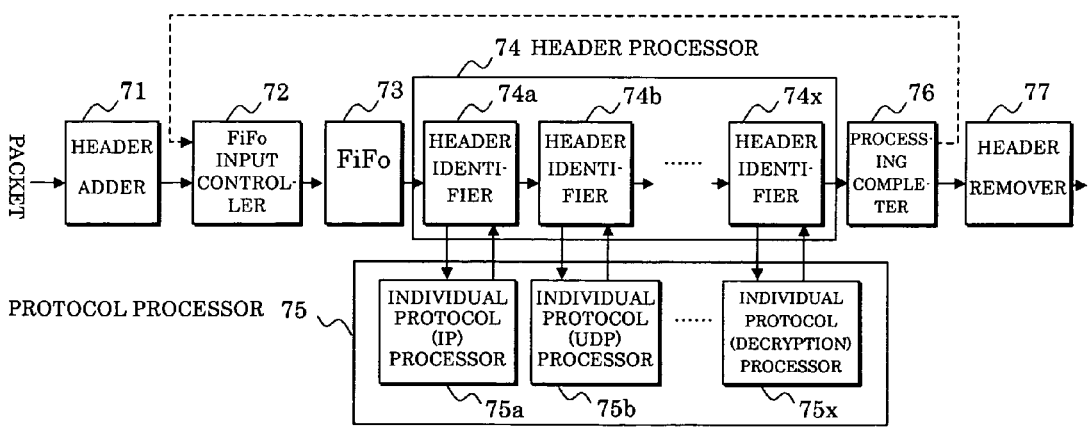
FIG. 13 is a block diagram showing an embodiment (2) of a communication device according to the present invention.

FIG. 13 shows an embodiment (2) of a communication device according to the present invention. This embodiment (2) is mainly different from the embodiment (1) in the following points: The protocol processor 24 is provided with the individual protocol processors 24a-24x in parallel, and the corresponding individual protocol processor is selected from among the individual protocol processors 24a-24x by the header identification of the header processor 23 to execute the protocol processing in the embodiment (1), while a header processor 74 in which header identifiers 74a-74x are connected in series is provided and individual protocol processors 75a-75x composing a protocol processor 75 are individually and mutually connected to the header identifiers 74a-74x in the embodiment (2).

Specifically, the communication device in the embodiment (2) is provided with a header adder 71 which adds a header to a received packet, a FiFo input controller 72 which controls the input to a FiFo 73 from the header adder 71, a processing completer 76 which inputs the received packet outputted from the FiFo 73 through the header processor 74 and identifies whether or not the packet processing has been completed, and a header remover 77 which removes the header of the received packet to which the completion is identified at the processing completer 76. A signal for a processing progress is provided to the FiFo input controller 72 from the processing completer 76.

Figure 14:
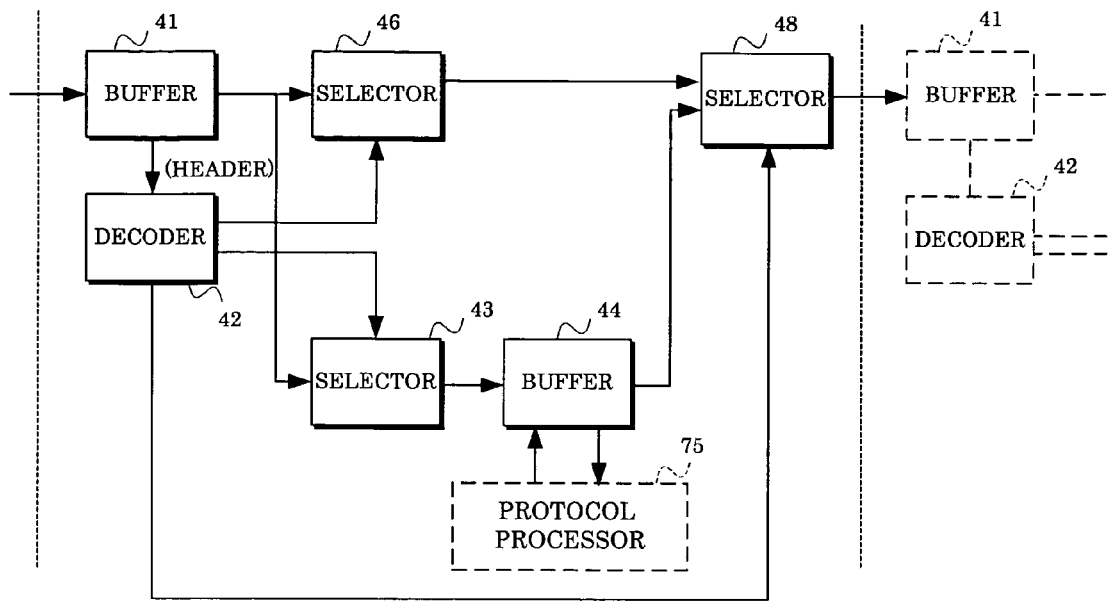
FIG. 14 is a block diagram showing an embodiment of each header identifier in the header processor shown in FIG. 13.

FIG. 14 shows a specific embodiment of the header identifiers 74a-74x shown in FIG. 13. Namely, the received packet is firstly inputted to the buffer 41, and the header within the packet is provided to the decoder 42, which is the same as the embodiment of FIG. 4. Also in this case, only the two selectors 43 and 46 are provided, and they are respectively controlled by the decoder 42, and the received packet is inputted from the buffer 41.

When each of the header identifiers 74a-74x itself identifies the header, the received packet of the buffer 41 is transmitted to the buffer 44 through the selector 43 since the selector 43 is selected by the decoder 42. The received packet is transmitted to the corresponding individual protocol processor (not shown) in the protocol processor 75, and the protocol processing is performed to the received packet. Then, the packet is returned to the buffer 44 and is further transmitted to the selector 48.

The selector 48 is similarly controlled by the decoder 42. In this case, since each of the header identifiers 74a-74x itself has identified the header, the buffer 44 is selected from among the buffer 44 and the selector 46, and the received packet is transmitted to the buffer 41 of the subsequent header identifier.

By repeating this operation, identification of all of the headers is performed and the individual protocol processing corresponding thereto is executed.

Since the header processor 74 normally has necessary header identifiers and each header identifier is connected to the corresponding individual protocol processor, it is found from the received packet passing through the header processor 74 that the processing is completed at the processing completer 76. In this case, the FiFo input controller 72 controls to input the subsequent packet to the FiFo 73.

Together with this operation, the header of the received packet whose processing has been completed is removed at the header remover 77 to be outputted.

It is to be noted in this case that even if the signal for inputting the subsequent packet to the FiFo input controller 72 is not provided from the processing completer 76, the header processor 74 may sequentially execute the protocol processing.

The above-mentioned operation can be applied to not only the protocol conversion based on the total number of protocol processings shown in FIGS. 6A-6U and FIGS. 7A-7S but also the protocol conversion performed by adding the total number of protocol processings and a predetermined processing order corresponding to the protocol attribute shown in FIGS. 10A-10K to the header, similarly.

Namely, in the example of FIGS. 6A-6U, the received packet to which the header shown in FIG. 6B is added at the header adder 71 is transmitted to the header processor 74 through the FiFo input controller 72 and the FiFo 73.

Supposing that the header identifiers 74a-74x are respectively and sequentially arranged to perform the protocol processing of the IP(x→y), UDP, L2TP, PPP, and IP(a→b) at the header identifier 74, protocol processing programs corresponding to the individual protocol processors 75a-75x in the protocol processor 75 are stored corresponding thereto. The procedure shown in FIGS. 6C-6U has only to be sequentially executed in the header identifiers 74a→74x.

After the packet is passed through the header processor 74, the processing completion is detected at the processing completer 76. The packet from which the header is removed at the header remover 77 becomes the packet after processing shown in FIG. 6U.

This can be applied to the example of FIGS. 7A-7S similarly.

Furthermore, such processings are similarly performed when a predetermined processing order shown in FIGS. 10A-10K is added to the header.

Namely, as shown in FIG. 10B, the received packet in which not only the total number of protocol processings but also encryption processing and IP processing corresponding to the protocol attribute at this time are added to the header is transmitted from the header adder 71 through the FiFo input controller 72 and the FiFo 73 to the header processor 74.

Each of the header identifiers 74a-74x in the header processor 74 identifies whether the protocol is for the encryption processing or for the IP processing, and when the header identifier 74x identifies the protocol for the encryption processing at the decoder 42, for example, the header identifier makes the corresponding individual protocol processor 75x process the received packet, and inputs the processed received packet to be further transferred to the subsequent header identifier.

By sequentially repeating this operation, the received packet shown in FIG. 10K can be obtained at the processing completer 76, and the header is removed at the header remover 77 to obtain the packet after processing.

Embodiment (3)

Figure 15:
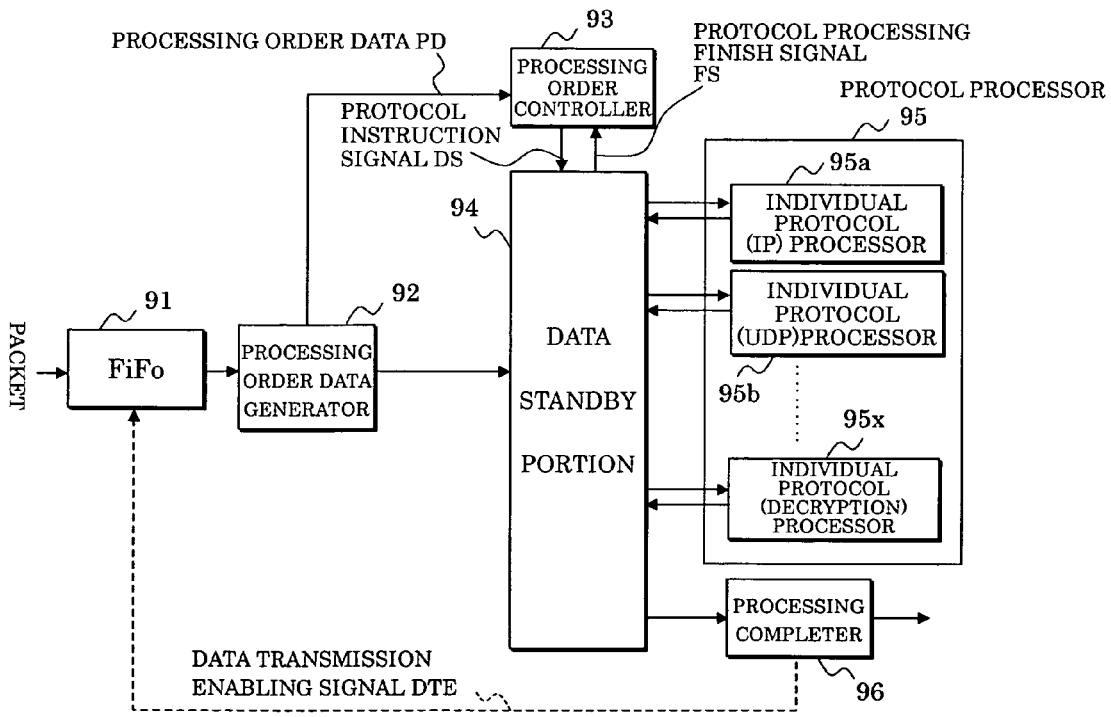
FIG. 15 is a block diagram showing an embodiment (3) of a communication device according to the present invention.

FIG. 15 shows an embodiment (3) of the communication device according to the present invention. The header is generated by using the header adder as the protocol processing order data to be added to the received packet in the above-mentioned embodiments (1) and (2), while the header is not added to the received packet, but a processing order data generator 92 independently generates the protocol processing order data to be provided to a processing order controller 93 as processing order data PD.

Also, the packet is provided to a data standby portion 94 from the processing order data generator 92, and the processing order controller 93 provides a protocol instruction signal DS to the data standby portion 94, whereby the data standby portion 94 transmits the received packet to the corresponding individual protocol processors 95a-95x in the protocol processor 95 to make the processing perform.

The protocol processor 95 transmits a finish signal FS of the execution to the processing order controller 93, and the received packet whose processing has been completed is held in the data standby portion 94.

Furthermore, it is arranged that the protocol processor 95 performs the processing by the subsequent processing protocol, and at the stage where the final processing has been finished, the processed packet is obtained from the data standby portion 94 through the processing completer 96.

Figure 16:
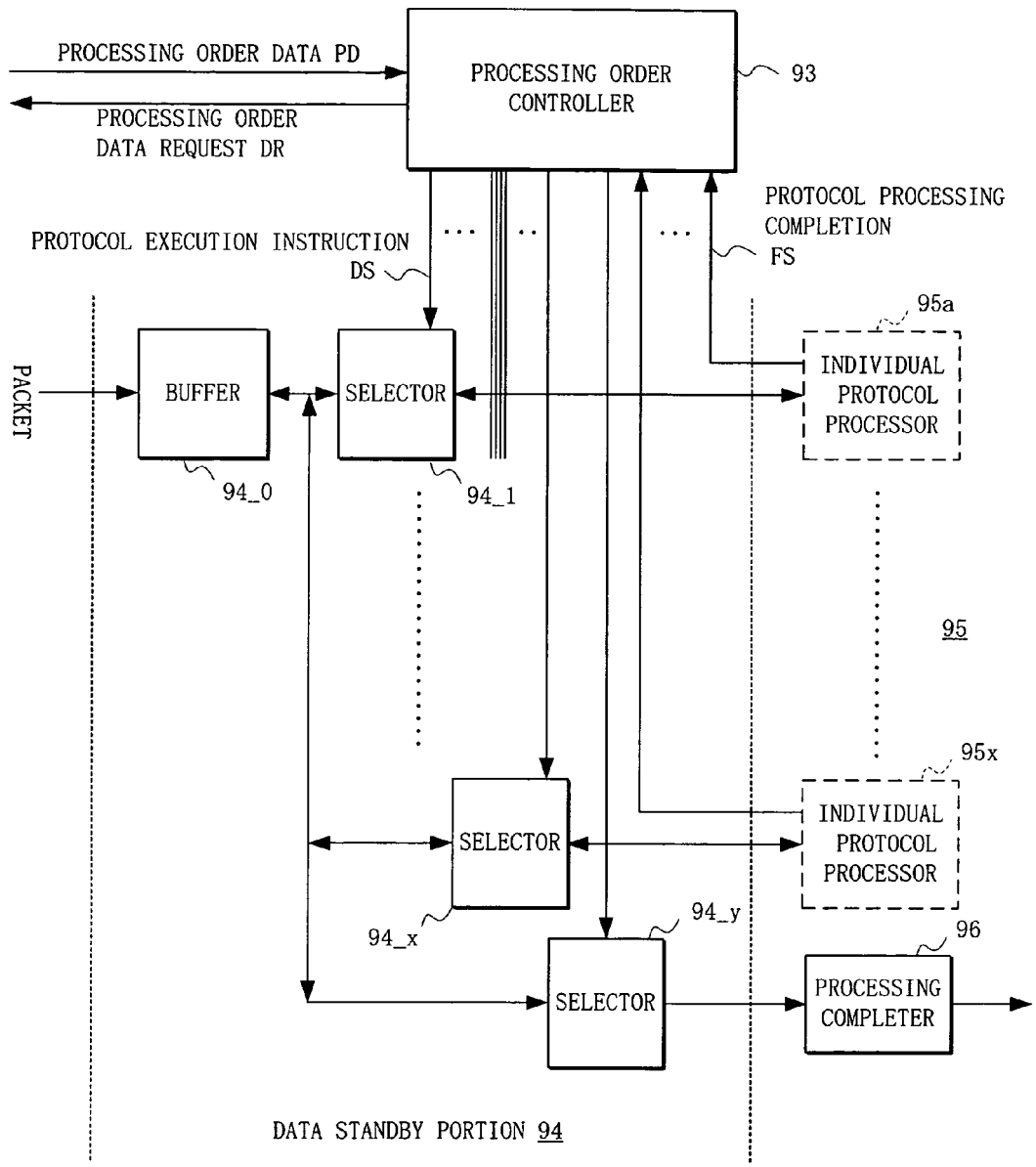
FIG. 16 is a block diagram specifically showing a data standby portion shown in FIG. 15.

FIG. 16 mainly shows an arrangement of the data standby portion 94 in this case.

Namely, the packet transmitted from a FiFo 91 through the processing order data generator 92 is stored in a buffer 94_0.

On the other hand, the processing order data generator 92 receives a processing order data request DR from the processing order controller 93 and provides the processing order data PD. The processing order controller 93 controls selectors 94_1-94_y, provides the received packet stored in a buffer 94_0 to the corresponding individual protocol processors 95a-95x, and the processing result is returned to the buffer 94_0 through the same selector.

By repeating such controls, the processing order controller 93 having determined that the processing has been finished (the present number of protocol processings=the total number of protocol processings) based on the processing order data PD provides the packet whose processing has been completed to the processing completer 96 from the buffer 94_0 through the selector 94_y, and outputs the packet whose processing has been completed.

Figure 17A:
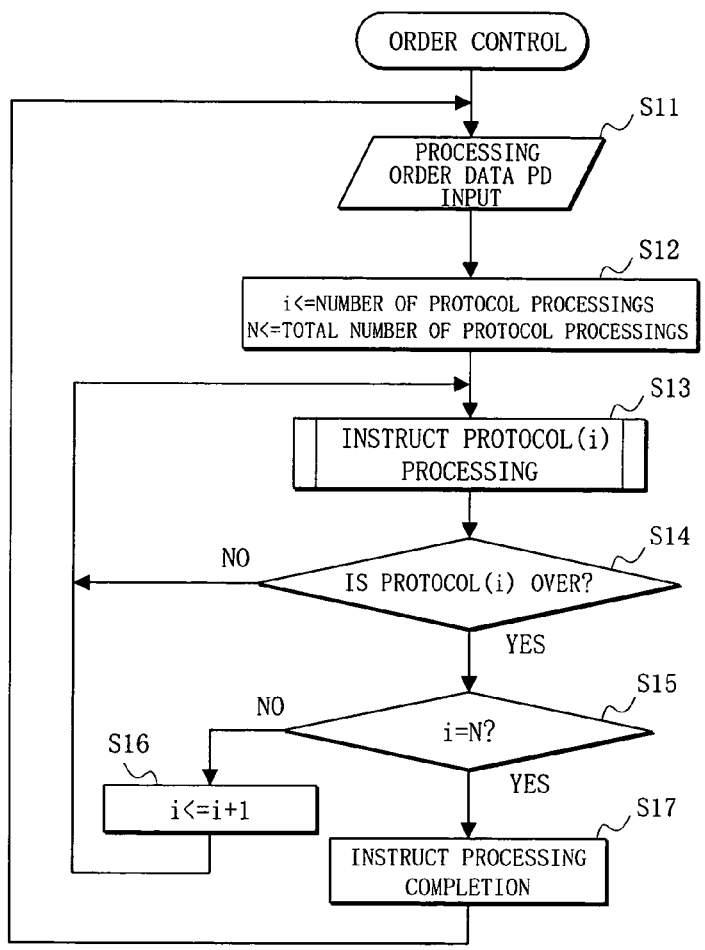
FIGS. 17A and 17B are operation flowchart of a processing order controller shown in FIGS. 15 and 16.

FIG. 17A shows a processing algorithm of the processing order controller 93 shown in FIG. 16, which indicates how the selectors 94_1-94_x and 94_y are controlled.

Figure 17B:
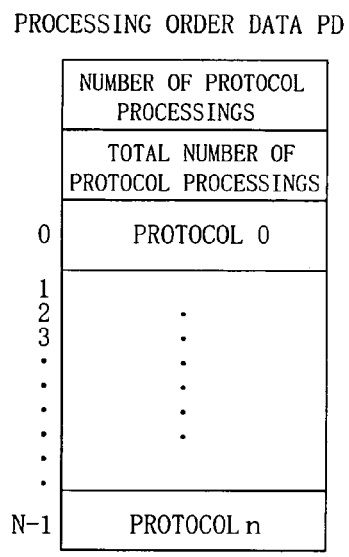

Namely, when the processing order data PD illustrated in FIG. 17B are inputted from the processing order data generator 92 (at step S11), and when the number of protocol processings is supposed to be "i", and the total number of protocol processings is supposed to be "N" (at step S12), the processing of a protocol (i) is instructed to the corresponding selectors 94_1-94_x (x≧N) (at step S13).

Whether or not the protocol (i) is finished is determined, and when it is not finished the process returns to step S13. When the protocol (i) is finished, whether or not i=N is determined, and when both are not coincident with each other "i" is incremented by "1" and the process returns to step S13. When i=N is determined, the process is completed and the received packet can be transmitted to the processing completer 96 from the buffer 94_0 by controlling the selector 94_y.

Since protocols according to the number of protocol processings and the total number of protocol processings, as well as a predetermined order as required are stored in the processing order data PD, also in the embodiment (3) as shown in FIG. 17B, the same protocol processings as the above-mentioned embodiments (1) and (2) can be executed.

Namely, although the processing order data PD shown in FIG. 17B include only the number of protocol processings and the total number of protocol processings in case of e.g. the LNS processing of FIGS. 6A-6U, the protocol processing shown in FIGS. 6C-6T can be sequentially executed if a protocol execution instruction DS is sequentially provided to the selectors 94_1-94_x corresponding to the individual protocol processors 95a-95x in the protocol processor 95.

By this processing being finished, the final packet in which the header is removed from 94_0 can be obtained from the processing completer 96 through the selector 94_y.

Also, when the predetermined processing order data shown in FIGS. 10A-10K are used, they are the processing order data PD themselves shown in FIG. 17B. Therefore, it is needless to say that this can be applied.

As described above, the communication device according to the present invention is provided with a protocol processing order data generator which detects a protocol attribute which connects the header identifiers 74a-74x included in the received packet in series and generates the protocol processing order data indicating the protocol processing order based on the protocol attribute, and a protocol converter which processes a plurality of protocols within the received packet based on the protocol processing order data. Therefore, in the example shown in FIGS. 20A and 20B, while the conventional technology requires the LNS provided to the gateway SG 2, in order to accommodate to any mode or session, the present invention can accommodate with a single device to any protocol and to receiving all of the conceivable packets.

What we claim is:

1. A communication device comprising:
a protocol processing order data generator which detects a protocol attribute included in a packet received and generates protocol processing order data indicating a protocol processing order based on the protocol attribute; and
a protocol converter which individually processes a plurality of protocols within the received packet based on the protocol processing order data, wherein the protocol processing order data generator generates a total number of protocol processings corresponding to the protocol attribute as the protocol processing order data, and the protocol converter sequentially processes the protocols set in the received packet from the head by the total number of protocol processings.

2. The communication device as claimed in claim 1 wherein the protocol processing order data generator comprises a header adder which adds to the received packet a header including the total number of protocol processings as the protocol processing order data, the protocol converter is provided with a protocol processor which individually processes the protocols, a header identifier which identifies the header and makes the protocol processor sequentially process the protocols within the received packet from the head, and a counter which counts a number of protocol processings at the protocol processor; and the header identifier finishes protocol processing when the number of protocol processings reaches the total number of protocol processings.

3. The communication device as claimed in claim 2 wherein the header identifier identifies a corresponding protocol and makes a corresponding individual protocol processor process the protocol.

4. The communication device as claimed in claim 1 wherein the protocol processing order data generator comprises a header adder which adds to the received packet a header including the total number of protocol processings as the protocol processing order data protocol converter is provided with a protocol processor which individually processes the protocols, a header processor which identifies the header and makes the protocol processor sequentially process the protocols within the received packet from the head, and a processing completer which accumulates a number of protocol processings at the header processor and which finishes protocol processing when the number of protocol processings reaches the total number of protocol processings.

5. The communication device as claimed in claim 4 wherein the header processor has a header identifier per protocol, and each header identifier identifies a corresponding protocol and makes a corresponding protocol processor process the protocol.

6. The communication device as claimed in claim 1 wherein the protocol processing order data include the total number of protocol processings, and the protocol converter is provided with a protocol processor which individually processes the protocols, a data standby portion which makes the received packet stand by, and a processing order controller which makes the protocol processor sequentially process protocols within the received packet in the data standby portion from the head based on the protocol processing order data, which accumulates a number of protocol processings at the protocol processor, and which finishes protocol processing when the number of protocol processings reaches the total number of protocol processings.

7. The communication device as claimed in claim 1 wherein when the protocol attribute indicates that the protocols are not processed sequentially from the head but require a predetermined processing order corresponding to the protocol attribute, the protocol processing order data generator generates the protocol processing order data that are the total number of protocol processings to which the predetermined processing order is added, and the protocol converter processes the protocols by the total number of protocol processings according to the predetermined processing order.

8. The communication device as claimed in claim 7 wherein when the protocol attribute indicates a security gateway, the predetermined processing order includes encryption processing.

9. The communication device as claimed in claim 1 wherein the protocol processing order data generator comprises a header adder which adds to the received packet a header including the total number of protocol processings and a predetermined processing order corresponding to the protocol attribute as the protocol processing order data, the protocol converter is provided with a protocol processor which individually processes the protocols, a header identifier which identifies the header and makes the protocol processor process the protocols within the received packet in the predetermined processing order, and a counter which counts a number of protocol processings at the protocol processor, and the header identifier finishes protocol processing when the number of protocol processings reaches the total number of protocol processings.

10. The communication device as claimed in claim 1 wherein the protocol processing order data generator comprises a header adder which adds to the received packet a header including the total number of protocol processings and a predetermined processing order corresponding to the protocol attribute as the protocol processing order data, and the protocol converter is provided with a protocol processor which individually processes the protocols, a header processor which identifies the header and makes the protocol processor process the protocols within the received packet in the predetermined processing order, and a processing completer which accumulates a number of protocol processings at the header processor and which finishes protocol processing when the number of protocol processings reaches the total number of protocol processings.

11. The communication device as claimed in claim 1 wherein the protocol processing order data include the total number of protocol processings and a predetermined processing order corresponding to the protocol attribute, and the protocol converter is provided with a protocol processor which individually processes the protocols, a data standby portion which makes the received packet stand by, and a processing order controller which makes the protocol processor process protocols within a received packet in the data standby portion in a predetermined processing order, based on the protocol processing order data, which accumulates a number of protocol processings at the protocol processor, and which finishes protocol processing when the number of protocol processings reaches the total number of protocol processings.

12. The communication device as claimed claim 1 wherein the protocol attribute comprises an IP address of a transmitting source or a destination.

13. The communication device as claimed in claim 1 wherein the protocol processing order data generator has a table associating the protocol attribute with the protocol processing order data.

14. The communication device as claimed in claim 1 wherein the protocol converter has a remover which removes the protocol processing order data after protocol processing.

* * * * *